United States Patent [19]

Litten

[11] Patent Number: 5,325,700
[45] Date of Patent: Jul. 5, 1994

[54] RAILCAR CUSHION DEVICE TESTER AND METHOD

[75] Inventor: Glen L. Litten, Springfield, Oreg.

[73] Assignee: Emerald Hydraulics, Inc., Springfield, Oreg.

[21] Appl. No.: 48,131

[22] Filed: Apr. 13, 1993

[51] Int. Cl.[5] ............................................. G01M 17/00
[52] U.S. Cl. .................................. 73/11.06; 73/11.09
[58] Field of Search ...................... 73/11.4, 11.6, 11.9, 73/669, 816; 364/424.03, 424.04, 551.01

[56] References Cited

U.S. PATENT DOCUMENTS

| | | |
|---|---|---|
| 1,303,948 | 5/1919 | O'Connor . |
| 1,787,675 | 1/1931 | Faus . |
| 1,921,624 | 8/1933 | Lewis . |
| 2,488,619 | 11/1949 | Dentler et al. . |
| 3,257,844 | 6/1966 | Shaver . |
| 3,410,131 | 11/1968 | Roesel . |
| 3,803,906 | 4/1974 | Ross ................................... 73/11.04 |
| 3,821,893 | 7/1974 | Klinger et al. ......................... 73/669 |
| 3,939,691 | 2/1976 | Stanev . |
| 4,002,051 | 1/1977 | Hilbrands . |
| 5,056,024 | 10/1991 | Stuyts ............................. 364/424.03 |

OTHER PUBLICATIONS

Norfolk Southern proposal to Emerald Hydraulics, dated Oct. 16, 1991.
Emerald Hydraulics response to Norfolk Southern, dated. Feb. 22, 1992.

*Primary Examiner*—Richard E. Chilcot, Jr.
*Assistant Examiner*—Ronald L. Biegel
*Attorney, Agent, or Firm*—Klarquist, Sparkman, Campbell, Leigh & Whinston

[57] ABSTRACT

A railcar cushion device is tested by applying a force necessary to move the cushion device in a controlled motion at a predetermined velocity or velocities according to a motion profile. The cushion device's performance is analyzed by measuring the force applied at various positions during the motion profile and comparing the force to a standard for cushion devices in good condition at the positions. Alternatively, a damping coefficient or other performance parameter for the cushion device is calculated from the force applied and position of the cushion device and compared to a standard to analyze cushion device performance. A tester for performing cushion device testing comprises a hydraulic ram and an electronic motion controller for applying the force to the cushion device. The motion controller uses motion feedback from a position transducer to provide the controlled motion to the cushion device.

31 Claims, 14 Drawing Sheets

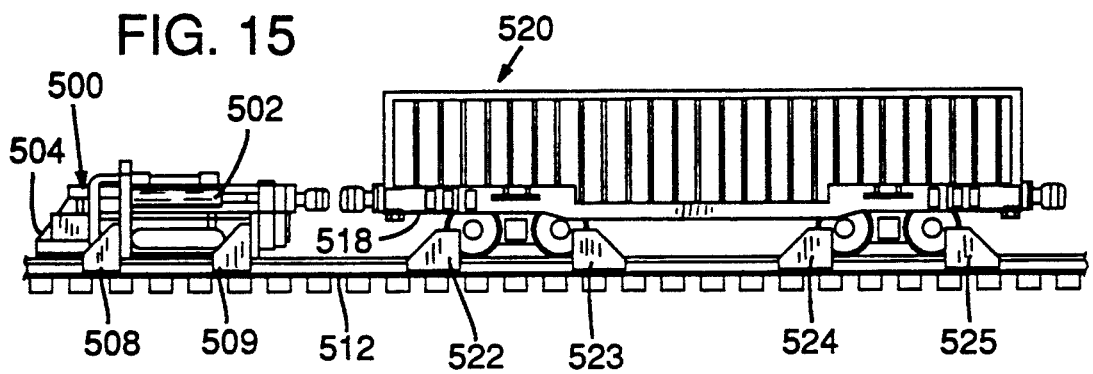
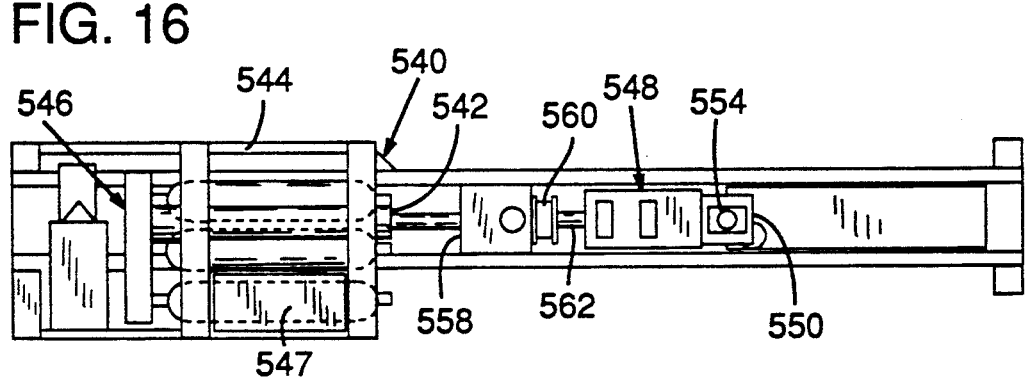
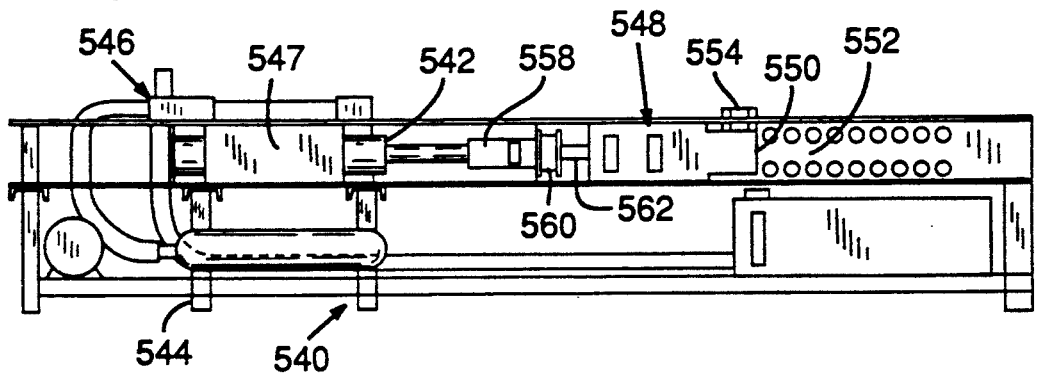

RAILCAR CUSHION DEVICE TESTER AND METHOD

FIELD OF THE INVENTION

The present invention relates to methods and apparatus for testing railcar cushion devices. More particularly, this invention relates to a method and apparatus for applying controlled kinetic energy to a railcar coupling cushion device and analyzing the cushion device's performance in response to the applied energy.

BACKGROUND OF THE INVENTION

In general everyday use, railcars collide together frequently. For example, the railcars of a train in motion generally bump into each other when the train slows or stops. Also, railcar collisions occur when assembling railcars into a train. The difference in velocity between the railcars in such collisions is typically low. However, due to the large mass of the railcars, the railcars collide with sufficient impact energy, unless otherwise absorbed, to cause damage to the railcars and any cargo carried by the railcars even in these collisions at low velocity differences. To absorb the impact of normal railcar collisions, a railcar generally includes cushion devices mounted at each end of the railcar between the railcar and its couplers. (In some railcars, a centrally mounted cushion device and sliding sill are used.)

Currently in common use on railcars are hydraulic cushion units which generally comprise a piston within a cylinder barrel filled with a hydraulic fluid, typically oil. In general, the devices can be described as non-linear hydraulic shock absorbers. In a railcar collision, the piston is displaced through the barrel. As the piston travels through the barrel, the hydraulic fluid in the barrel is compressed by the piston, forcing the fluid through orifices in the cylindrical wall of the barrel. The action of forcing the fluid through orifices acts to absorb impact energy by heating the fluid. Generally, the amount of force that can be translated into heat energy is proportional to the square of the piston velocity.

Typically, hydraulic cushion units are configured to absorb a constant force throughout the piston stroke by varying the number of orifices through which the fluid vents as the piston is displaced. More specifically, the orifices are distributed along the length of the barrel. Therefore, during the course of the piston's travel through the barrel, the piston bypasses orifices one (or more) by one, leaving fewer and fewer orifices through which the fluid can vent. When the force absorbed by a cushion device is maintained substantially constant, the rate of change of acceleration is minimal. Thus, this configuration serves to minimize sudden changes in velocity or "jerking" motions of railcars connected in a train. After absorbing an impact, the piston is returned to its initial position in the barrel of the cushion device by mechanical springs or a gas charged device.

In the typical operating environment, railcar cushion devices are subject to failure, particularly in the hydraulic seals, from the wearing of moving parts and from rust and corrosion. Failure can also result from the stress of impacts greater than the rated capacity of the devices. To assure proper functionality of the devices, the performance of the devices is periodically tested.

Various test methods are known. Some test methods involve visual inspection for noticeable signs of impairment, e.g. rust, breaks, and leaked hydraulic fluid. However, failures frequently occur without producing noticeable signs of impairment. Therefore, with visual inspection alone, many failures remain undetected. Also, the cushion devices may be difficult to inspect visually while installed on a railcar.

Another type of test, referred to herein as range of motion testing, involves moving the cushion devices through a normal range of motion to detect failures that result in binding or obstruction of free movement. This type of test can detect impairments that are not visually apparent, but fails to detect abnormal cushion device operation short of binding. It is possible to perform this type of test on an installed cushion device.

Most other test methods are of a type, referred to herein as impact testing, that involves exposing a cushion device to kinetic energy and then analyzing the forces produced by the cushion device to detect non-conforming operation. A variety of means for exposing the cushion device to kinetic energy are known.

One such means is a drop hammer. In general, a drop hammer comprises a hammer member and an anvil member. The cushion device is removed from the railcar and mounted on top of the anvil member. The hammer member is raised on a vertical frame or track above the cushion device and anvil member by pulleys or the like. The hammer member is then allowed to drop on the cushion device from a predetermined height above the cushion device thereby applying a known amount of kinetic energy to the cushion device. The forces produced by the cushion device are measured using a load cell comprising a pressure transducer, a piston, and a fluid filled cylinder in the anvil member.

One disadvantage of the drop hammer is that it requires removal of the cushion device from the railcar. Removing and reinstalling the cushion device is time-consuming and expensive. The railcar must be placed out of service while the cushion device is removed, possibly resulting in lost revenue to the railroad company for the cargo that could have been carried by the railcar during this time. Further, to allow regular testing of cushion devices involving removal of cushion devices from railcars, a railroad company may be required to maintain more rolling stock or a larger stock of replacement cushion devices.

The standard means in the railroad industry of applying kinetic energy to a cushion device involves simply running a rolling railcar into a stationary railcar on which the cushion device is installed. Typically, the rolling railcar is released from a predetermined elevation on an incline so that the amount of kinetic energy is applied to the cushion device can be estimated. The forces produced by the cushion device are typically calculated indirectly from a measurement of the post-collision velocity of the stationary railcar.

The disadvantages of this method are that the method is inexact, time-consuming to carry out, not easily repeatable or reproducible, and can result in damage to one or both railcars. More specifically, the amount of kinetic energy applied to the cushion device is generally assumed from the elevation on the incline at which the rolling railcar was released. The actual final velocity of the rolling railcar at the time of the collision, however, is affected by friction and other forces. Typically, there is significant variance in the final velocity between repetitions of the test and for different rolling railcars used in the test. Since kinetic energy is a function of the square of velocity, this variance in final velocity can significantly affect the actual kinetic energy applied by the rolling railcar to the cushion device at the time of the collision. The applied kinetic energy is also a function of the mass of the rolling railcar which typically varies for different rolling railcars used to test cushion devices and may not be accurately known. Results of this test methodology are therefore inexact and not sufficiently repeatable.

In general, prior impact testing methods and apparatus apply a predetermined amount of kinetic energy in an initial impact to a railcar cushion device and analyze the forces produced by the cushion device. However, after the initial impact, the motion of the cushion device is uncontrolled and generally unknown, being dependent on the function or performance of the cushion device itself and other factors. An analysis of the forces produced by cushion devices according to such tests are therefore often not comparable to those of other cushion devices because the applied motion after the initial impact is not identical and not known.

A test method and apparatus is therefore needed to provide repeatable and reproducible testing of railcar cushion devices in a short amount of time with or without removal of the cushion device from the railcar. Further, a test method and apparatus is needed for accurately diagnosing conformance of railcar cushion device performance with rated parameters.

SUMMARY OF THE INVENTION

The present invention provides railcar cushion device testing that is repeatable, reproducible, and accurate. In accordance with the present invention, a force is applied to a cushion device to move the cushion device in a predetermined motion (the motion profile). Identical motion profiles are produced when testing various cushion devices regardless of the particular cushion device being tested through use of a feedback control system. By controlling the cushion device's motion according to the motion profile, the test produces repeatable and reproducible results regardless of cushion device performance. The force applied to the tested cushion device to attain the motion profile is analyzed to produce a force or damping coefficient profile that permits accurate comparison to specified performance standards.

In one embodiment of the invention, the force is applied to the cushion device under test by a hydraulic ram. A transducer, electronic motion controller, and servo valve provide positional feedback control to drive the hydraulic ram according to the motion profile. Accumulators are used to store the amount of energy needed to simulate the forces and speeds experienced in normal railcar collisions. The forces produced by the cushion device when subjected to the motion profile are measured by pressure sensors in the hydraulic ram and analyzed by a computer or data processing device to form a force or damping coefficient profile indicative of cushion device performance.

In accordance with another aspect of the invention, a portable cushion device tester of the nature described above is provided to permit field testing of cushion device performance without requiring removal of the cushion device under test from its railcar. For portability, the hydraulic ram with feedback control is mounted on a portable truck having wheels for supporting the truck on a standard railroad track. To test a cushion device on a railcar, the portable tester is placed on the track and securely attached to one end of the railcar where the cushion device is installed. In one embodiment of the invention, the portable tester includes fork lift tubes to facilitate placement of the tester on the rails and further includes arms with hydraulic clamps mounted on a vertically and horizontally adjustable carriage for versatile and secure attachment to the railcar.

Additional features and advantages of the invention will be made apparent from the following detailed description of a preferred embodiment which proceeds with reference to the accompanying drawings.

BRIEF DESCRIPTION OF THE DRAWINGS

FIG. 15 is a side view of a stationary railcar cushion device tester according to a third embodiment of the invention;

FIG. 16 is a top view of a stationary railcar cushion device tester according to a fourth embodiment of the invention; and FIG. 17 is a side view of the stationary railcar cushion device tester of FIG. 16.

DETAILED DESCRIPTION OF THE PREFERRED EMBODIMENT

Figure 1:
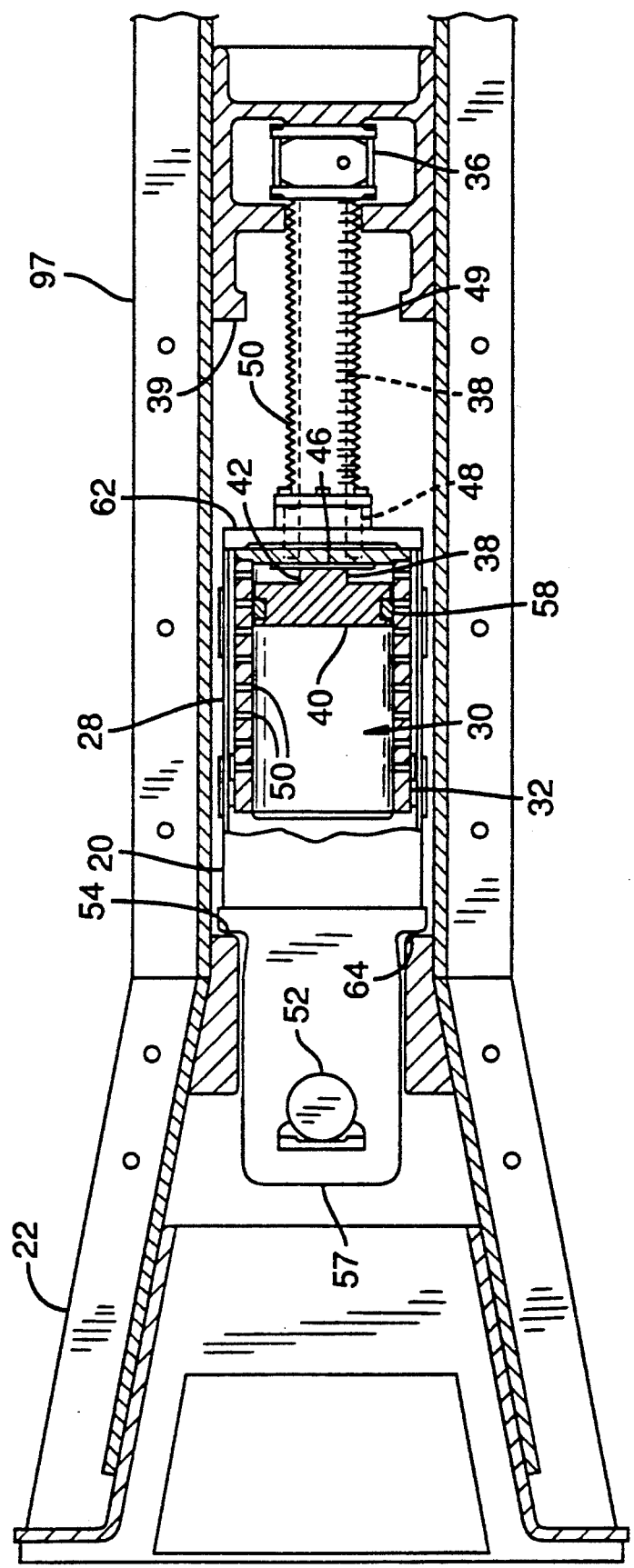
FIG. 1 is a top view, partly cut away, of a conventional hydraulic cushion device installed in a sill of a railcar.

With reference to FIG. 1, a conventional hydraulic, end-of-car coupling cushion device 20 is generally installed in a sill 22 at each end of a railcar 24 (FIG. 2) to absorb the kinetic energy of collisions, such as may occur between the railcar 24 and other railcars. The sill 22 is an elongated, horizontal supporting structure which is longitudinally and centrally located under the railcar 24. The cushion device 20 comprises a housing 28 which defines a cavity 30 filled with a hydraulic fluid, preferably a premium anti-wear hydraulic oil such as the ISO series produced by Mobil Corporation. Encased within the cavity of the housing is a cylindrical barrel 32. One end 36 of a rod 38 is fixedly mounted to the sill 22 in a back stop casting 39. A piston 40 at a distal end 42 of the rod 38 is slidingly received within the barrel 32. The rod extends through suitable seals 46, 48 to prevent oil leakage from the barrel 32 and housing 28 and is encased in an accordion sheath 49 between the housing 28 and casting 39.

The cushion device 20 absorbs the kinetic energy of an impact or collision by transforming the kinetic energy to heat energy. The energy transfer is accomplished by the action of the piston 40 forcing the hydraulic fluid through orifices 50 in the barrel 32. The railcar 24 has mounted at each end thereof a conventional coupler 51 (FIG. 2) for attaching the railcar to other railcars in a train. Each of the couplers, such as the coupler 51, is attached to a cushion device 20 with a pin 52 which engages in a cooperative opening in a butt end 57 of the cushion device. In a railcar collision, the housing 28 of the cushion device 20, which is normally held against a sill lug stop 54 by mechanical springs or a gas charged device under the sill (not shown) is moved inwardly toward the railcar (to the right in FIG. 1) by a force applied through the coupler 51 and pin 52 to the butt end 57. The rod 38 and piston 40 remain stationary relative to the railcar because of the fixed mounting of the rod end 36 to the sill 22 in the back stop casting 39. The piston 40 thus presses against the hydraulic fluid within the barrel 32 forcing the fluid to vent through the orifices 50. The piston 40 is sealed with an O-ring 58 to prevent the fluid from escaping past the piston. In a railcar cushion device of this type, the amount of impact energy absorbed is generally proportional to the squared velocity of the piston 40 within the cushion device 20.

As the piston 40 travels through the barrel 32, the piston bypasses the orifices 50 one or more at a time, leaving progressively fewer orifices through which the compressed hydraulic fluid can vent. The progressively smaller stepping of the number of orifices creates a relatively constant resistive force through out the stroke of the piston 40.

Inward motion of the cushion device is halted when a back stop 62 of the housing 28 engages the back stop casting 39. The cushion device 20 is in full buff position when the back stop 62 engages the back stop casting 39. When the inward force on the cushion device ceases, the mechanical springs or gas charged device returns the cushion device 20 to its normal or draft position where a stop 64 on the cushion device housing 28 engages the sill lug stop 54.

Figure 2:
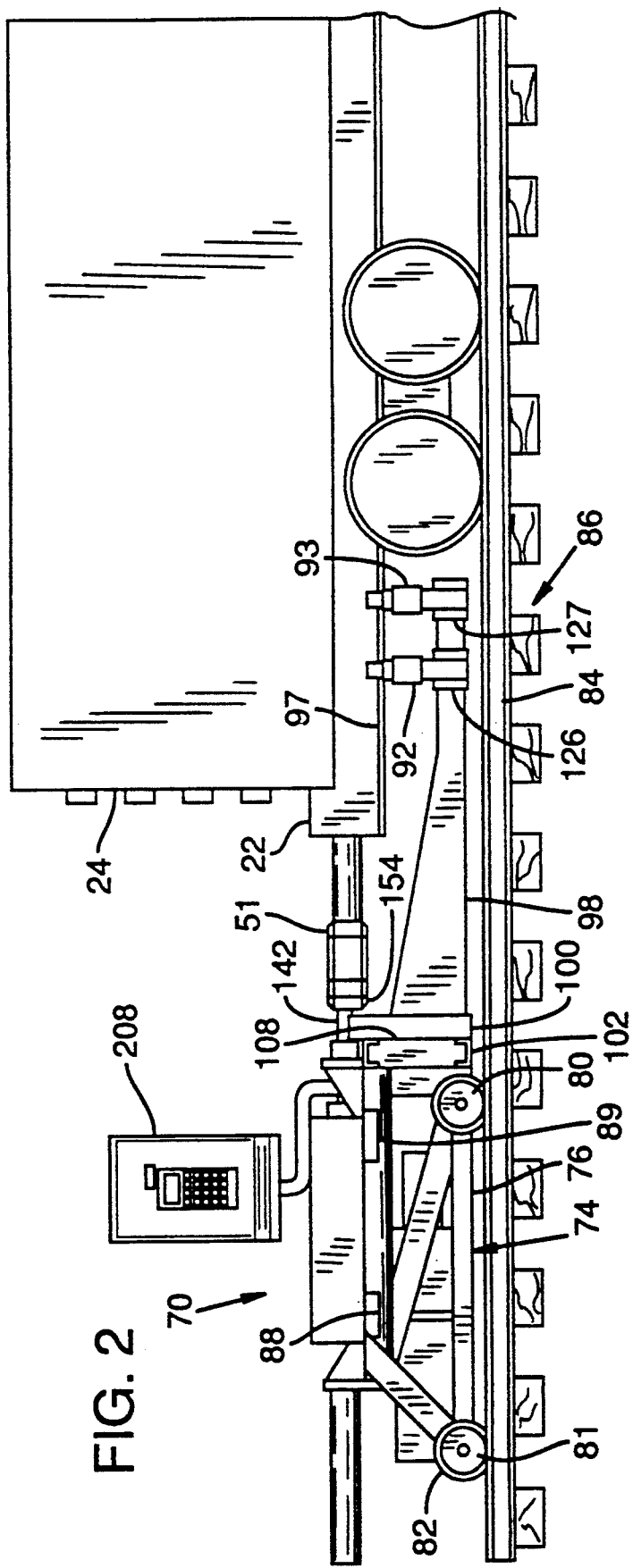
FIG. 2 is a side view of a portable railcar cushion device tester according to a first embodiment of the invention coupled to the end of a railcar for testing a cushion device of the railcar.
Figure 3:
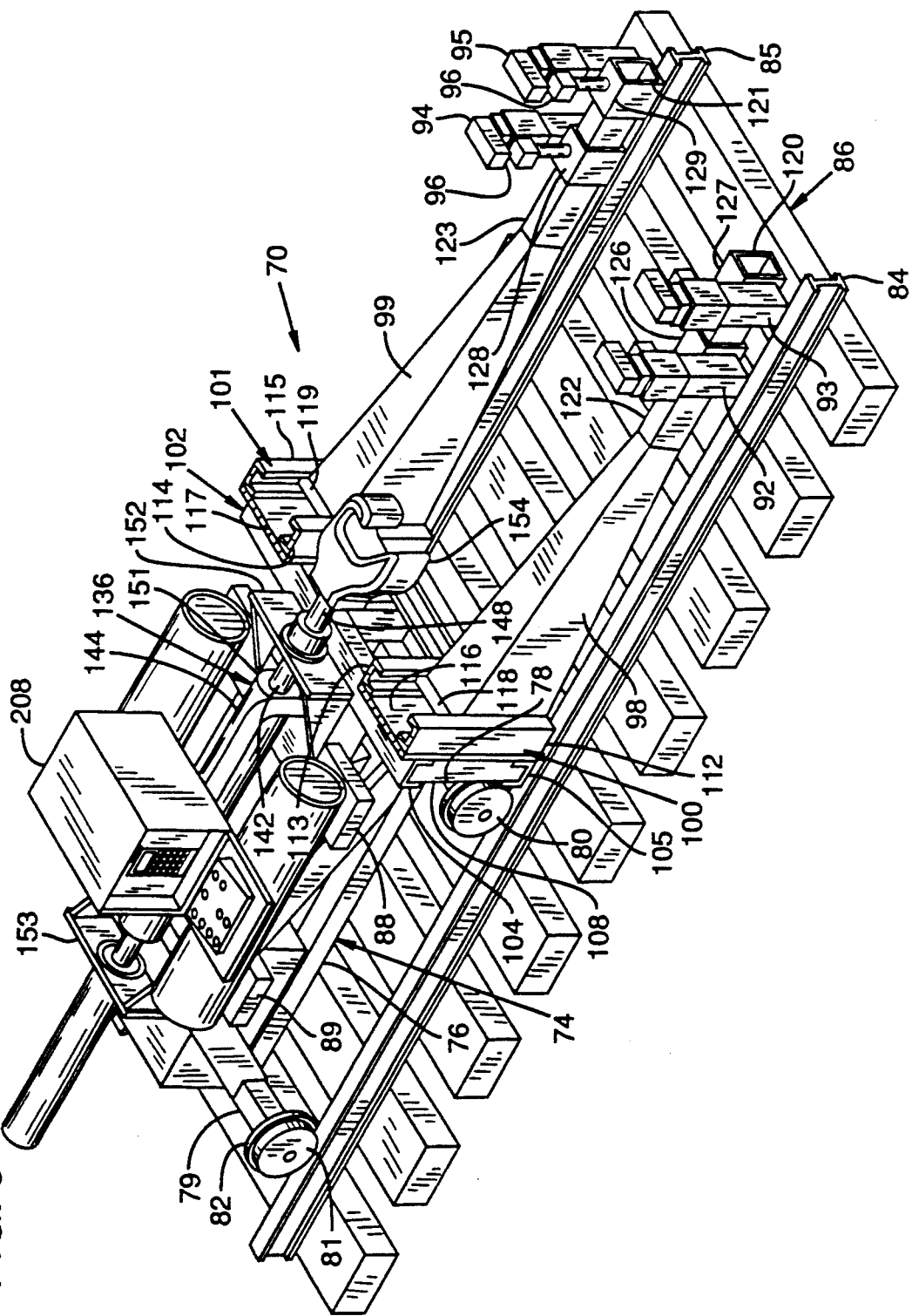
FIG. 3 is an enlarged perspective view of the portable railcar cushion device tester of FIG. 2.

In accordance with the embodiment of the invention illustrated in FIGS. 2 and 3, a railcar cushion device tester 70 provides a portable apparatus for testing the performance of railcar cushion devices such as the hydraulic cushion device 20 on the railcar 24. Although illustrated as testing hydraulic end-of-car railcar cushion devices, it is to be understood that the invention is applicable to the testing of other types of railcar cushion devices including draft gear types.

For portability, the tester 70 preferably comprises a truck 74 which supports testing equipment. The truck 74 includes a frame 76 mounted on fixed front and rear axles 78, 79. Flanged wheels 80, 81 are rotatably mounted at opposite ends of each of the axles 78, 79 for engaging parallel rails 84, 85 of a railroad track 86. Parallel fork lift tubes 88, 89 are mounted laterally on the frame 76. The tubes 88, 89 are hollow and generally rectangular in cross section. A fork lift (not shown) is thereby able to engage the tester 70 for transportation by inserting its elevating fork arms into the tubes 88, 89. The tester 70 is therefore portable in the sense that it is an integrated testing apparatus that can be transported to a field testing site such as a rail yard on a flatbed pickup truck, railcar, or the like where it is lifted by a fork lift onto a railroad track 86 and moved on rails 84, 85 to a position adjacent to the railcar 24 whose cushion device 20 is to be tested.

Figure 14:
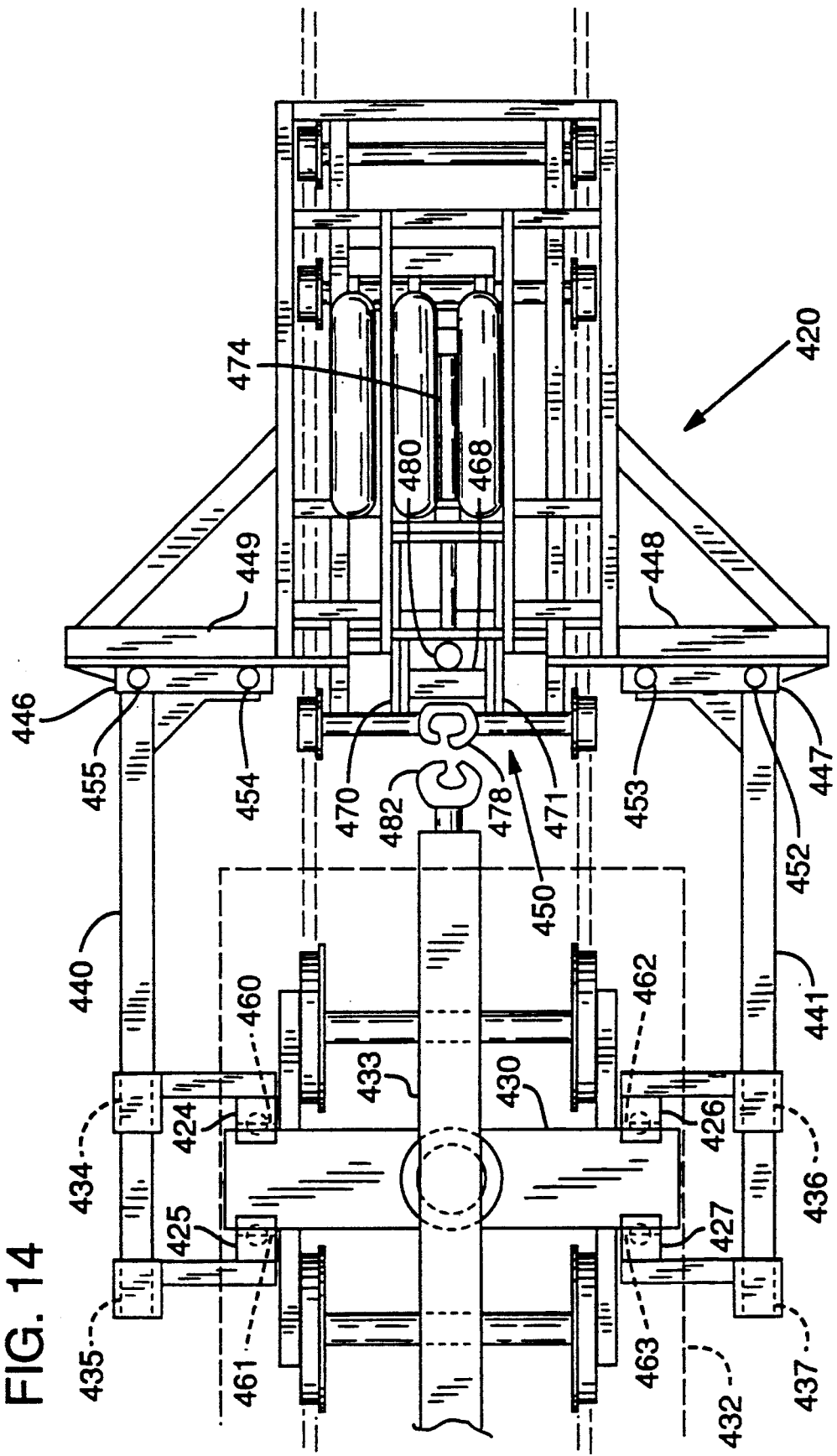
FIG. 14 is a top schematic view of a portable railcar cushion device tester according to a second embodiment of the invention and configured to attach to a railcar's bolster plate.

The tester 70 attaches to the railcar 24 using hydraulic clamps 92-95 on support arms 98, 99 preparatory to testing the cushion device 20. Each of the hydraulic clamps comprise a pair of vertically opposed, hydraulically actuated jaws 96 for gripping onto a part of the railcar 24. In FIG. 2, the tester is shown with the hydraulic clamps 92-95 attached to a flange 97 on the sill 22 of the railcar 24. However, attachment can also be made to a bolster plate or other structure of the railcar 24 as shown in FIG. 14 and described below. The support arms 98, 99 are mounted on lift carriages 100, 101, which in turn are mounted on an arm carriage 102 to permit horizontal and vertical adjustment of the hydraulic clamps relative to the railcar 24. The arm carriage 102 comprises a pair of U-shaped channels 104, 105 mounted laterally to the frame 76 forward of the front axle 78 in parallel, horizontal orientation, one above the other, with their open sides or grooves facing each other. The grooves of the U-shaped channels 104, 105 operate as dual tracks for receiving rectangular block-shaped extensions 108 of the lift carriages 100, 101.

The lift carriages 100, 101 also comprise pairs of U-shaped channels 112-115 mounted in parallel, vertically oriented relation to base plates 116, 117 with their grooves facing each other. The base plates 116, 117 are, in turn, mounted to the lift carriage extensions 108 which engage the arm carriage 102 as described above. Elongated, outwardly extending flanges at a base or proximal end 118, 119 of each of the support arms 98, 99 are slidingly engaged in the U-shaped channels 112 of the lift carriages 100, 101 to permit vertical movement of the support arms 98-99. The hydraulic clamps 92-95 are attached to the support arms 98-99 near distal ends 120, 121 thereof. Using the lift and arm carriages 100-102, the distance separating opposing pairs of the hydraulic clamps 92-95 from each other and their height above the track 86 can be adjusted to facilitate attachment of the hydraulic clamps to railcars of various configurations.

To further facilitate attachment of the hydraulic clamps to railcars of differing configurations, the position of the hydraulic clamps 92-95 on the support arms 98, 99 is adjustable. Portions 122, 123 of the support arms 98, 99 adjacent their distal ends 118, 119 are formed with the shape of hollow, rectangular cross section beams of uniform width and height. The hydraulic clamps 92-95 are mounted on rectangular cross section sleeves 126-129 of larger width and height than the support arm portions 122, 123 to fit around the support arm portions. With the support arm portions 122, 123 inserted into the sleeves 126-129, the sleeves are slidingly engaged on the support arms allowing the distance of the hydraulic clamps 92-95 from the truck 74 along the support arms 98, 99 to be adjusted. Preferably, the carriages 100-102 and sleeves 126-129 are individually hydraulically actuated and electronically controlled for ease of adjustment. A hydraulic cylinder and electronically controlled valve (not shown) for each carriage and sleeve can be provided for this purpose. The hydraulic clamps 92-95 on support arms 98, 99 have the further advantage of permitting the tester 70 to apply force in two directions to the cushion device 20 to both compress and extend the cushion device 20 while maintaining secure attachment to the railcar 24.

Figure 4:
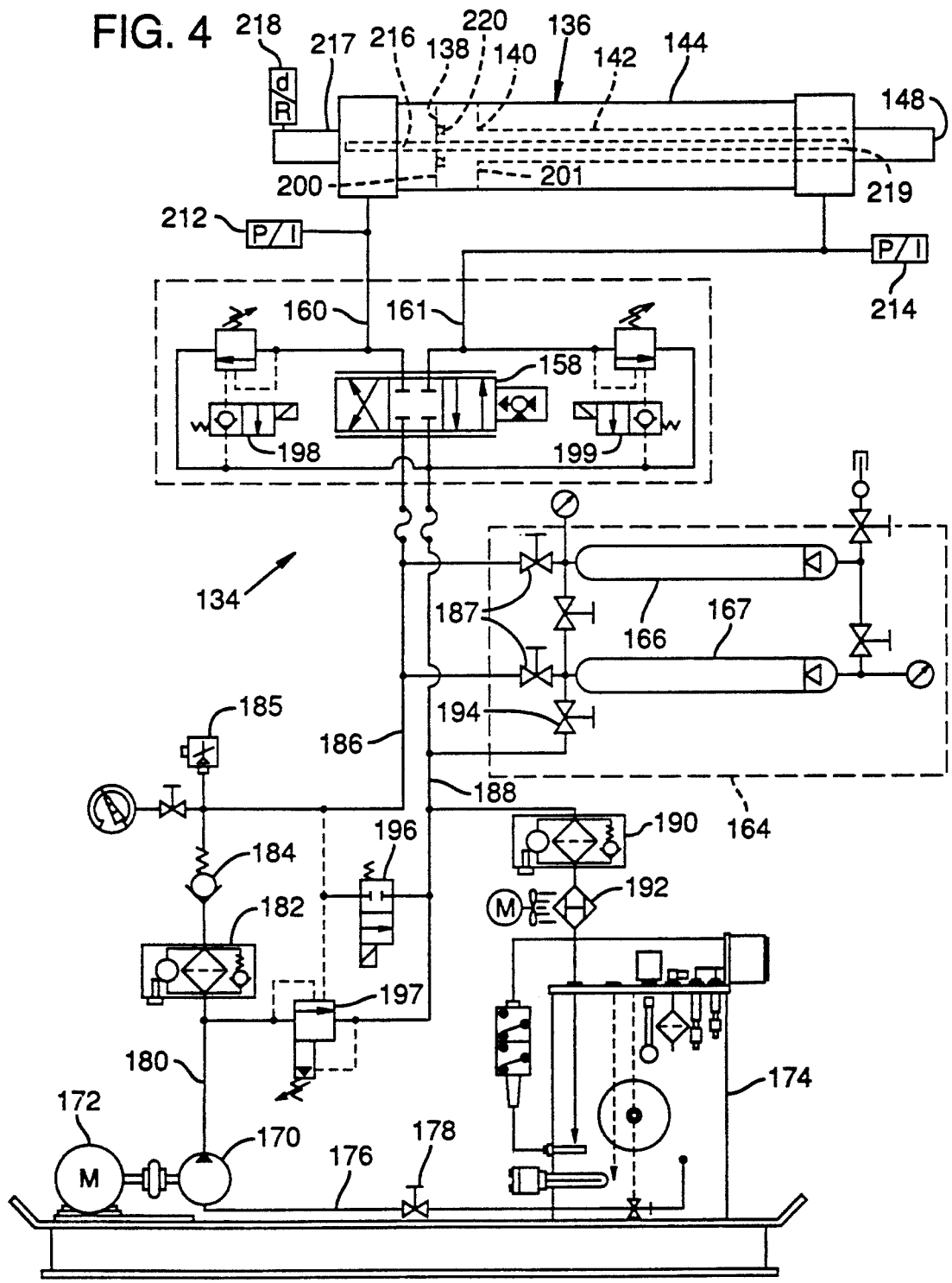
FIG. 4 is a schematic diagram of the hydraulic system of the portable railcar cushion device tester of FIG. 2.

Referring to FIGS. 2-4, the tester 70 employs a hydraulic system 134 comprising a hydraulic ram 136 to apply a controlled motion to the cushion device 20 and analyze cushion device performance. The hydraulic ram 136 comprises a piston 138 on one end 140 of a rod 142 within a cylinder 144. An opposite end 148 of the rod 142 projects outwardly from the cylinder 144 through a cooperative circular opening in a front end 151 of the cylinder. The hydraulic ram 136 is mounted longitudinally to the top of the frame 76 of the truck 74 on brackets 152, 153, with the end 148 of the rod 142 projecting forwardly (towards the railcar 24). A conventional coupler 154 of the type used to couple railcars together is mounted to the rod 142 at the forwardly projecting end 148.

The hydraulic ram 136 is operated by introducing hydraulic oil into or discharging the oil from the cylinder 144 on either side of the piston 138. The introduction of hydraulic oil to and discharge from the cylinder 144 is controlled by a servo valve 158 (FIG. 4). The servo valve 158 is connected to the cylinder 144 with rear and front fluid conveying lines 160-161, one to each end of the cylinder. Hydraulic oil under pressure is supplied to the servo valve 158 for introduction into the cylinder 144 by an accumulator bank 164 comprising one or more accumulators 166, 167. The tester 70 is illustrated in FIGS. 2-4 with two accumulators 166, 167, but can comprise any number of accumulator of various configurations so long as the accumulator bank 164 has sufficient capacity to store the energy needed to test the cushion device 20 of the railcar 24.

Prior to testing the cushion device 20, hydraulic oil is pumped into the accumulators 166, 167 by a pump 170 driven by a motor 172 to build up the pressure in the accumulators. A hydraulic oil reservoir 174 contains a supply of hydraulic oil for use by the hydraulic system 134. The hydraulic oil is provided from the reservoir 174 to the pump 170 through a supply line 176 and manually operated shut-off valve 178. The pump 170 forces the hydraulic oil from an outlet line 180 through a main pressure filter 182 and check valve 184 to a feed manifold 186 connected to the servo valve 158 and connected through manually operated shut-off valves 187 to the accumulators 166, 167. The check valve 184 prevents the hydraulic oil in the feed manifold from backing up to the outlet line 180 and pump 170. An accumulator pressure switch 185 regulates the pressure in the feed manifold 186 and accumulators 166, 167, by activating the pump 170 when the pressure drops below a desired minimum level and deactivating the pump 170 when the pressure is sufficient.

The servo valve 158 and accumulators 166, 167 are also connected to a discharge manifold 188 for discharging the hydraulic oil back into the reservoir 174 through a main return filter 190 and heat exchanger 192. The accumulators 166, 167 connect to the discharge manifold 188 with a manually operated shut-off valve 194 which is normally closed. The pressure in the accumulators 166, 167 can also be relieved by discharging hydraulic oil from the feed manifold 186 to the discharge manifold 188 through an electrically actuated accumulator dump valve 196. The pressure in the outlet line 180 of the pump 170 can also be relieved by discharging hydraulic oil from the outlet line to the discharge manifold 188 through an electrically actuated unloading valve 197. The pressure in the rear and front lines can be relieved through electrically actuated unloading valves 198, 199. The pressure throughout the system is normally relieved for emergencies or for system shut-downs when the tester 70 is taken out of service for extended periods.

The servo valve 158 operates to drive the piston 138 and rod 142 of the hydraulic ram 136 forwardly and rearwardly. To drive the piston 138 forwardly towards the railcar 24, the servo valve 158 connects the feed manifold 186 to the rear line 160 and the discharge manifold 188 to the front line 161. This introduces additional hydraulic oil into the cylinder 144 to the rear of the piston 138 and discharges hydraulic oil from the cylinder forward of the piston. The increased pressure of the hydraulic oil on a rear face or blind end 200 of the piston 138 and decreased pressure on a forward face or rod end 201 creates a force to drive the piston 138 forwardly. To drive the piston 138 rearwardly, the servo valve 158 connects the feed manifold 186 to the front line 161 and the discharge manifold 188 to the rear line 160. This creates a force on the piston 138 which drives the piston rearwardly.

Figure 5:
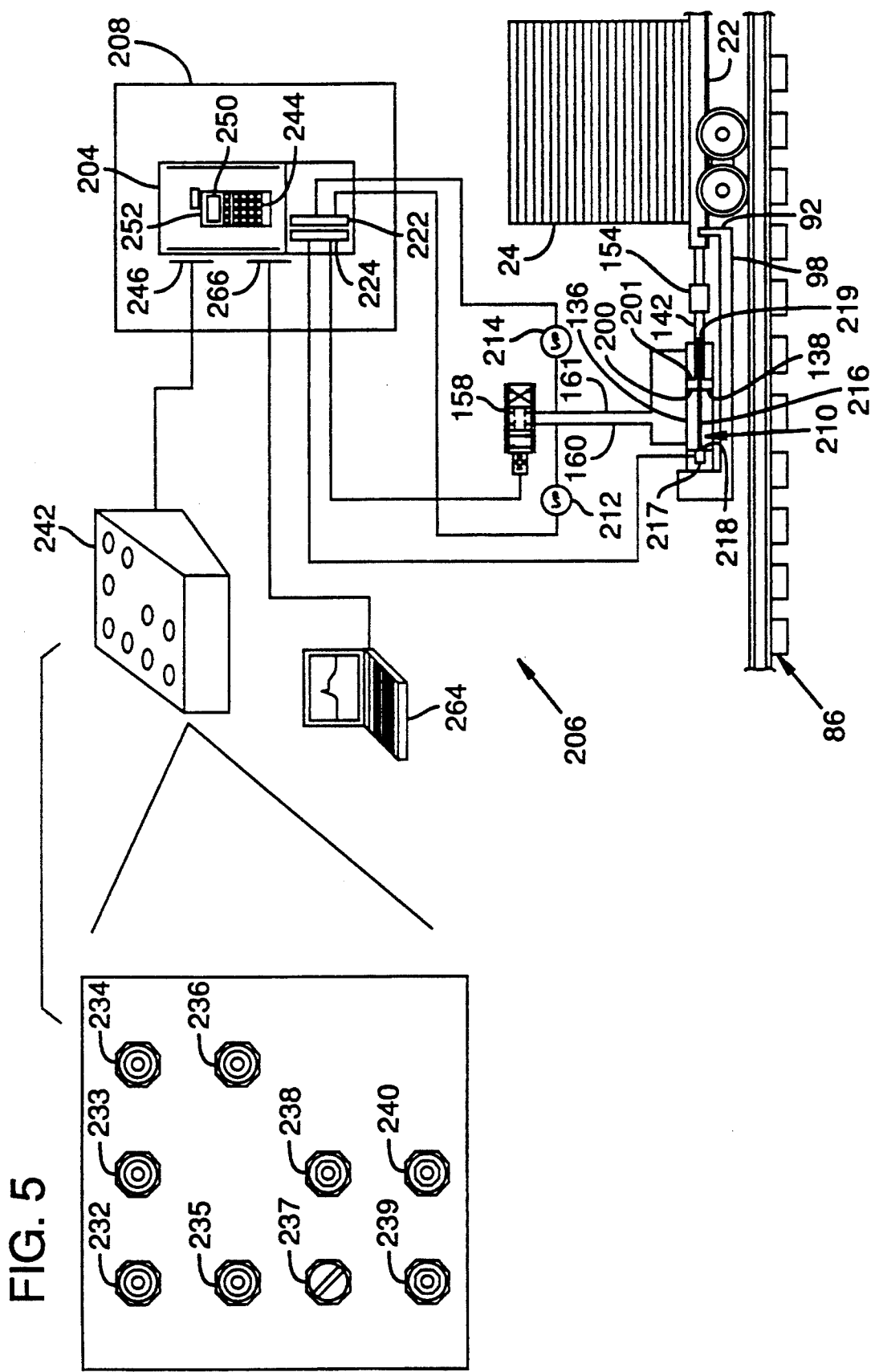
FIG. 5 is a schematic diagram of the electrical system of the portable railcar cushion device tester of FIG. 2.

With reference to FIG. 5, the operation of the servo valve 158 is controlled by an electronic motion controller 204 in an electrical system 206. The electronic motion controller 204 controls the motion applied by the hydraulic ram 136 to the cushion device 20 according to a predetermined motion profile described below. The motion controller 204 is preferably implemented with a microprocessor which operates according to a custom designed software program. A change in operation of the motion controller 204 can thereby be made without changing its hardware circuits by simply altering its software code. A suitable motion controller of this type is the Programmable Digital Servo Controller model XDC 700 available from MTS Systems Corporation, Machine Controls Division of Eden Prairie, Minn.

The motion controller 204 is housed in an enclosure 208 mounted on the frame 76 of the cushion device tester 70. The enclosure 208 can further house necessary peripheral equipment including power supplies, and relays. The enclosure 208 is preferably located on top of the tester 70 and within reach of an operator standing alongside the tester. In the illustrated embodiment, the enclosure 208 is a Nema 4 type enclosure.

The motion controller 204 receives electrical signals from a position transducer 210 and pressure transducers 212, 214 as inputs. The position transducer 210 can be suitably implemented with a magnetostrictive absolute linear position transducer such as the TEMPOSONICS (TM) linear displacement transducers available from MTS Systems Corporation, Sensors Division of Research Triangle Park, N.C. A position transducer of this type comprises a hollow, cylindrical transducer rod 216 within the cylinder 144. One end 218 of the transducer rod 216 is fixedly attached at a rear end of the cylinder 144 to a transducer head enclosure 217. An opposite end 219 of the transducer rod 216 is slidingly engaged within a cylindrical cavity through the center of the piston 138 and rod 142. An annular magnet 220 (see FIG. 4) located in the piston 138 and encircling the transducer rod 216 produces a magnetic field around the transducer rod 216 in the vicinity of the piston 138. Responsive to the magnetic field, conventional electronic circuits (not shown) in the head enclosure 217 produce an electrical signal related to the position of the piston 138 within the cylinder 144.

The pressure transducers 212, 214 are connected to the rear and forward lines 160, 161, respectively, of the hydraulic system 134. Responsive to the pressure in the lines 160, 161, the pressure transducers 212, 214 produce electrical signals related to the pressure of the hydraulic oil in the cylinder 144 on the blind and rod ends 200, 201, respectively, of the piston 136. The pressures on the blind and rod ends 200, 201 are related to the force exerted on the piston 136 in the forward and rearward directions, respectively.

Since the motion controller 204 is implemented with digital electronics, the analog electrical signals produced by the transducers 210, 212, and 214 must be converted to digital numerical data prior to processing. The motion controller comprises analog-to-digital converters 222 to convert the pressure transducer signals to digital. A servo control module 224 contains similar converter circuitry for converting the position transducer signal to digital.

The motion controller 204 also receives operator inputs from controls 232-240 on an operator's console 242 and from a data entry keypad 244. The console 242 is connected to an interface port 246 on the motion controller 204. The data entry keypad 244 and a display 250 are located on a front panel 252 of the motion controller 204. Using the controls 232-240 which include buttons, switches and indicator lights, an operator can perform a test procedure or series of test procedures on the cushion device 20 as described below in connection with FIGS. 6-11. Parameters for the cushion device tests are entered into the motion controller using the keypad 244. The test parameters are displayed on the display 250 for monitoring purposes.

Figure 12:
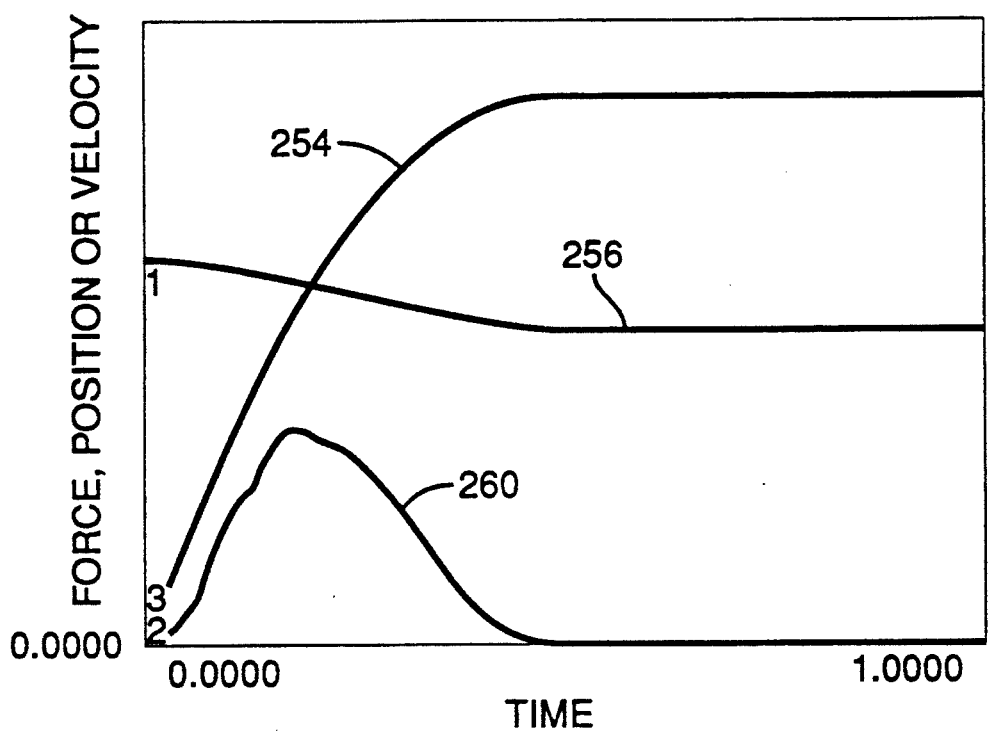
FIG. 12 is a graph of a position, velocity and force profile of a normal railcar cushion device as tested by the portable railcar cushion device tester of FIG. 2.
Figure 13:
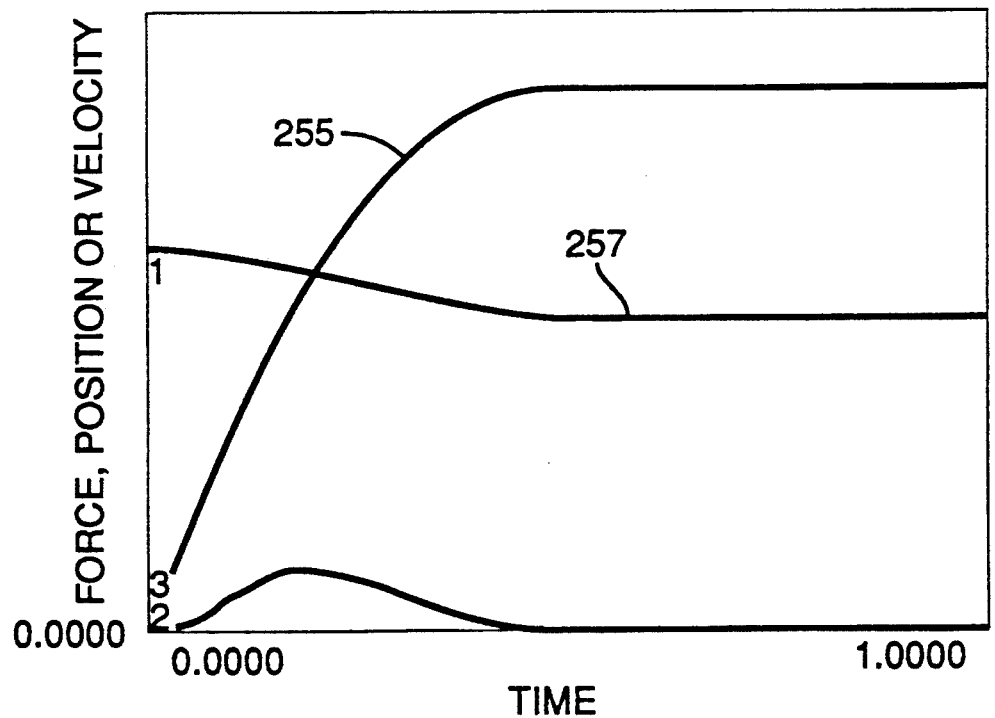
FIG. 13 is a graph of a position, velocity and force profile of a defective or damaged railcar cushion device as tested by the portable railcar cushion device tester of FIG. 2.

With reference to FIGS. 12 and 13, the cushion device tests generally involve moving the cushion device 20 in a predetermined motion so that various aspects of the performance of the cushion device can be accurately measured and analyzed. The predetermined motion is referred to herein as a motion profile. The motion profile can be described by graphs 254, 255 of the position of the piston 138 as a function of time and graphs 256, 257 of the velocity of the piston 138 as a function of time. The particular motion profile produced by the tester 70 is determined by the test parameters entered into the motion controller 204 with the keypad 244. Different motion profiles applied to the cushion device 20 can be used to analyze different aspects of cushion device performance.

Referring again to FIG. 5, the motion controller 204 operates to move the piston 138 and, consequently, the cushion device 20 in a predetermined motion profile regardless of the performance of the cushion device. The electrical signal produced by the position transducer 210 is used to provide motion feedback to the motion controller 204. Responsive to the position transducer signal, the motion controller 204 drives the servo valve 158 with a control signal generated by the servo control module 224 to regulate the introduction and discharge of hydraulic oil from the cylinder 144 through the lines 160, 161. For example, when driving the piston 138 forwardly according to the predetermined motion profile, the motion controller 204 uses the position transducer signal to sense the current position of the piston in the cylinder and determine whether the piston position lags or leads the motion profile. If the actual position of the piston lags the motion profile, the motion controller drives the servo valve 158 with a control signal to increase the introduction of hydraulic oil into the cylinder 144 through the rear line 160 and/or increase the discharge of hydraulic oil from the cylinder through the front line 161. This serves to increase the net forward force on the piston, speeding the forward movement of the piston. If, however, the actual piston position leads the motion profile, the controller retards the piston's forward motion by decreasing the introduction of oil to the rear line 160 and discharge from the front line 161. This decreases the forward force on the piston. The position transducer 210, motion controller 204, and servo valve 158 thus act as a feedback control system operative to servo piston motion to the desired motion profile. The motion controller 204 can also operate in reverse to apply a controlled reverse motion to the cushion device 20.

To analyze the performance of the cushion device 20, the motion controller 204 processes electrical signals generated by the pressure transducers 212, 214 to determine a parameter related to the performance of the cushion device 20 such as the force that must be applied to the cushion device 20 to attain the motion profile or the damping coefficient of the cushion device 20. The signals generated by the pressure transducers 212, 214 are related to the pressure of the hydraulic oil in the cylinder 144 on the blind end 200 and the rod end 201 of the piston 138. The force applied by the hydraulic ram 136 to the cushion device 20 to obtain the predetermined motion profile is a function of these pressures, as follows:

$$F = A_1 \cdot P_1 - A_2 \cdot P_2 \quad (1)$$

where F is the force applied to the cushion device 20, $A_1$ and $A_2$ are the surface areas of the blind end 200 and rod end 201 of the piston 138, respectively, and $P_1$ and $P_2$ are the hydraulic oil pressures on the blind end 200 and rod end 201, respectively.

Referring again to FIGS. 12 and 13, the force that must be applied to the cushion device 20 to obtain the predetermined motion profile is indicative of its performance. A force profile or graph 260, 261 of the force as a function of time can be determined by the motion controller 204 from the pressure transducer signals by recording the force determined according to equation (1) during the applied motion profile. In the illustrated embodiment, for example, the force is determined at measurement intervals occurring every 2-5 milliseconds during the applied motion profile to form a force profile. A cushion device in good condition has a force profile 260 similar to that shown in FIG. 12. A force profile 261 (FIG. 13) of a defective cushion device having a large leak around its piston seals differs substantially from the force profile 260.

Referring again to FIG. 5, in the illustrated embodiment of the invention, the motion controller 204 is programmed to determine whether the force profile of the tested cushion device 20 meets empirically determined standards for a cushion device in good condition. Standards defining an acceptable magnitude for the force applied to a cushion device in good condition at each force measurement interval during a test is stored in a table within the motion controller 204. The motion controller 204 compares the force applied to the cushion device 20 being tested at each measurement interval to the standard defined in the table. When a force outside of a predetermined tolerance limit from the empirically determined standards must be applied to the cushion device 20 to attain the motion profile, the cushion device fails the test. Failure of the cushion device 20 to meet the standards is indicated by illuminating a test failure indicator light 236 on the operator console 242.

In the illustrated embodiment, information generated by the motion controller 204 during a test (including the force profile of a tested cushion device 20) is recorded by a data acquisition computer 264 (or like data processing device) such as a lap top-style personal computer. The motion controller 204 transmits the information to the data acquisition computer 264 from an interface port 266. The data acquisition computer 264 preferably includes a video monitor, mass storage device such as hard or floppy disk storage, and a built-in printer. The data acquisition computer 264 is thereby capable of displaying the information on the video monitor, storing the information on the mass storage device, or printing the information on its printer. Alternatively, in other embodiments of the invention, the motion controller 204 is programmed to process or record test result information and directly print, store or display the information on attached recording and/or displaying devices such as a strip chart recorder.

The motion controller 204 can alternatively analyze cushion device performance by processing the position transducer signal and pressure transducer signals to determine the cushion device's damping coefficient. The damping coefficient of the cushion device 20 is a function of the pressures on the piston 138 and the velocity of the piston as follows:

$$K = \frac{V^2}{\Delta P} \quad (2)$$

where $$\Delta P = \frac{P_1 \cdot A_1 - P_2 \cdot A_2}{A_{CD}^2} \quad (3)$$

and where K is the damping coefficient; V is the velocity of the piston 138; $P_1$ and $P_2$ are the hydraulic oil pressures on the blind end 200 and the rod end 201 of the piston, respectively: $A_1$ and $A_2$ are the areas of the blind and rod ends, respectively; and $A_{CD}$ is the working area of the cushion device. Similar to force profile analysis, the motion controller 204 compares the damping coefficient of the cushion device 20 at a number of measurement intervals during a test to empirically determined damping coefficient standards for cushion devices in good condition. The plural damping coefficient measurements form a damping coefficient profile of the cushion device. Failure of the cushion device 20 to fall within a predetermined tolerance of the standards is indicated by illuminating the test failure indicator light 236. Damping coefficient information can also be transferred to the data acquisition computer 264 or other recording and displaying devices.

The advantage of using a cushion device's damping coefficient to analyze its performance is that the damping coefficient is independent of the test velocity. The force produced by the cushion device is not. Therefore, with damping coefficient performance analysis, any variations of the actual test velocity from the desired motion profile can be ignored. Also, the same damping coefficient standards can be used for tests at different velocities.

Figure 6:
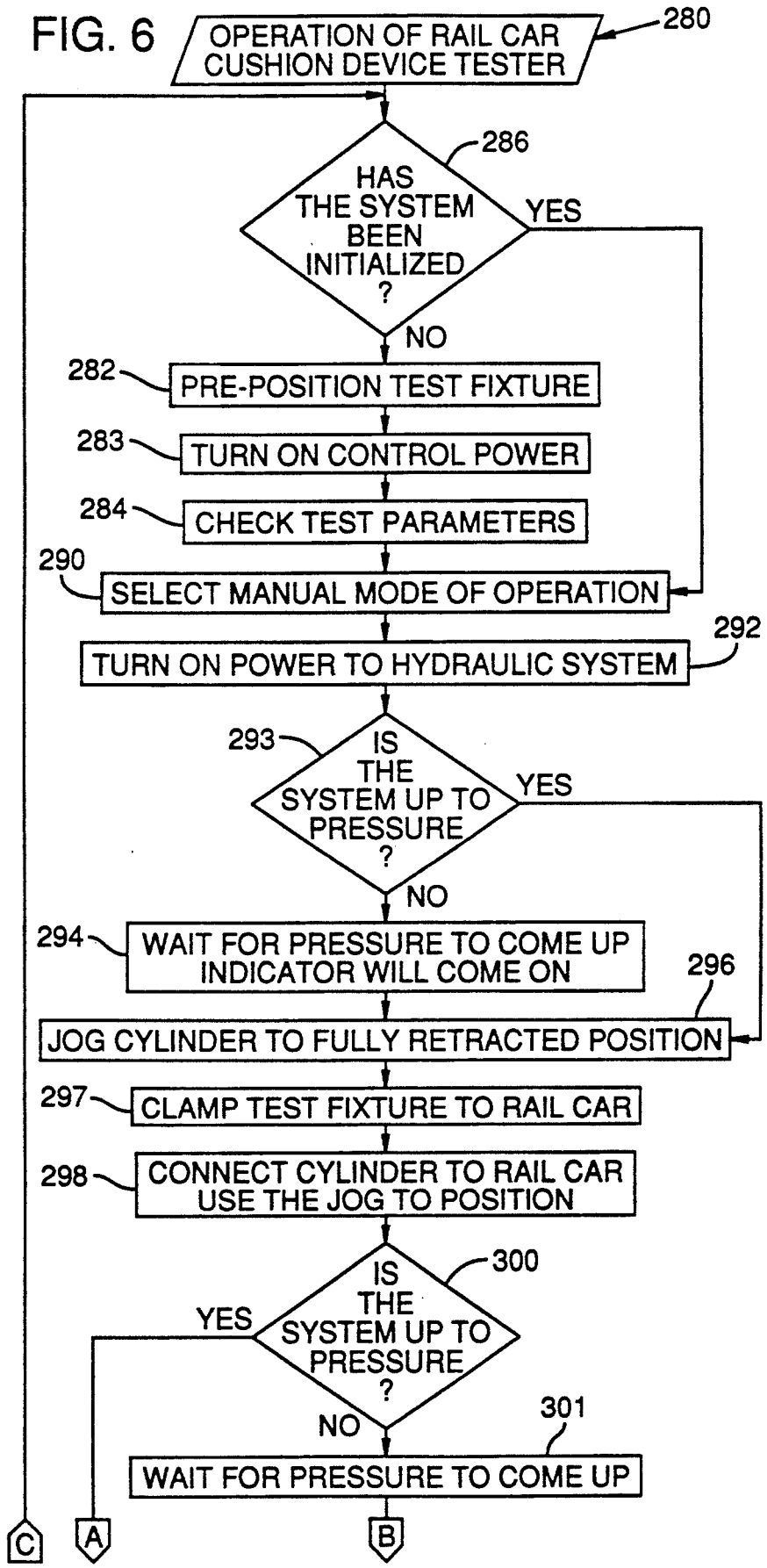
FIG. 6 is a flow chart of the operation of the portable railcar cushion device tester of FIG. 2.
Figure 7:
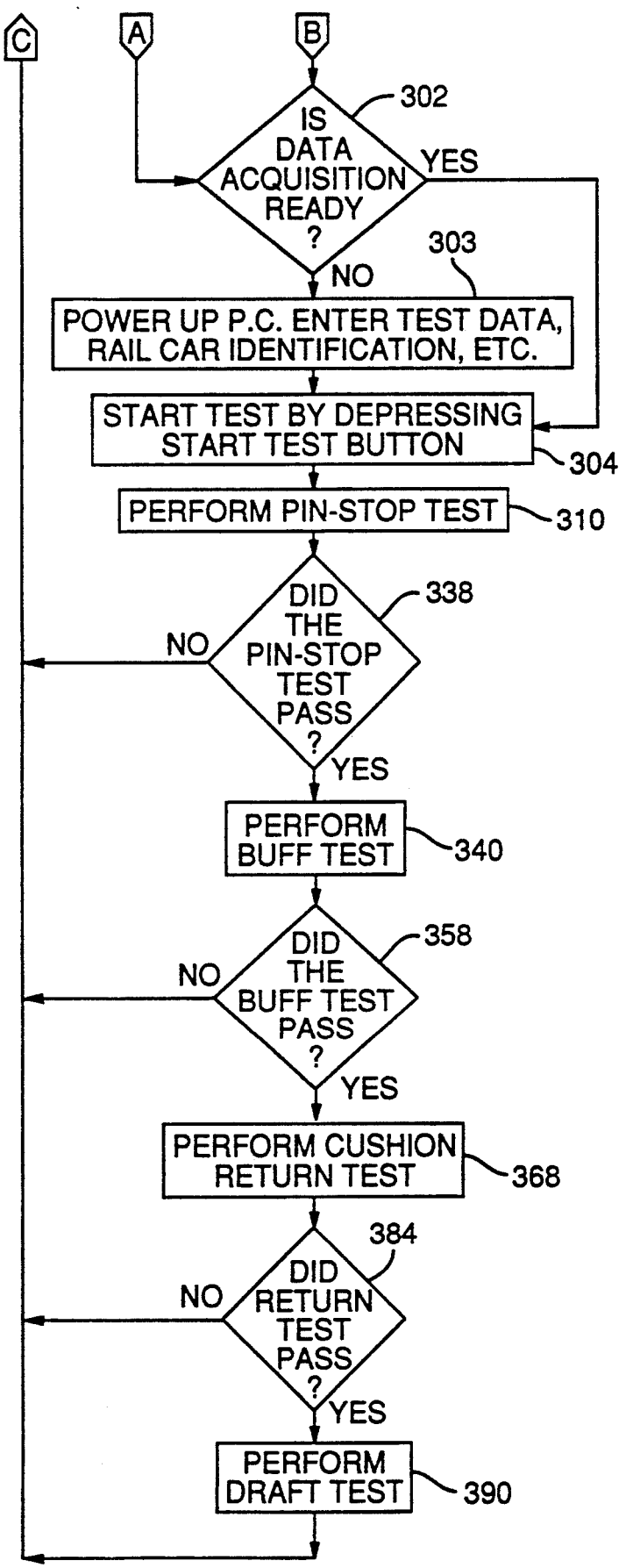
FIG. 7 is a continuation of the flow chart of FIG. 6.

With reference to FIGS. 5-7, the operators console 242 houses various controls 232-240 for operating the tester 70, including an emergency stop button 232, control power button 233, clamp button 235, start test button 238, jog forward button 239, jog reverse button 240, manual/test selector switch 237, test ready indicator light 234, and test failure indicator light 236. In other embodiments of the invention, other types of controls can be used. For example, a joy-stick type control can be used in place of the jog forward and reverse buttons 239-240. In some embodiments of the invention, controls in addition to those described are provided such as a separate joy-stick type control for adjusting the position of the hydraulic clamps 92-95. The controls 232-240 are used by an operator according to an interactive test procedure 280 set forth in FIGS. 6-11 to test the performance of the cushion device 20.

In the test procedure 280, initialization steps 282-284 are performed first to prepare the tester 70 for operation. As indicated at a decision step 286, the initialization steps 282-284 are omitted if they have already been performed in a previous execution of the test procedure 280. At initialization step 282, the tester 70 is positioned on the railway track 86 adjacent to and facing the railcar 24, with the tester coupler 154 and hydraulic clamps 92-95 extended towards the railcar. Next, power to the electrical control system 206 is turned on (step 283). Then, in initialization step 284, the operator checks the parameters of the test using the keyboard 244 and display 250 on the motion controller 204.

At step 290, the tester 70 is switched to a manual mode of operation using the two-position, manual/test selector switch 237. The tester 70 has two modes of operation, manual and test. In the manual mode of operation, the jog forward and jog reverse buttons 239, 240 are active, permitting manual operation of the hydraulic ram 136. The start test button 238 is not active. In the test mode of operation, the start test button 238 is active and the jog forward and reverse buttons 239, 240 are inactive.

Steps 292-294 prepare the hydraulic system 134 for operation. In step 292, power for the hydraulic system 134 is turned on. The motor 172 can then drive the pump 170 to fill the accumulators 166, 167 with hydraulic oil. In steps 293-294, the operator waits for the hydraulic system 134 to come up to full pressure by pumping hydraulic oil into the accumulators 166, 167. When the hydraulic system 134 is up to pressure, the test ready indicator light 234 comes on.

Next in attachment steps 296-298, the tester 70 is attached to the railcar 24. First, in step 296, the piston 138 is moved to its fully retracted position within the cylinder 144. In the illustrated embodiment, the jog forward and jog reverse buttons 239-240 are used to manually position the piston 138. The motion controller 204 retracts the piston 138 when the jog reverse button 240 is activated and nudges the piston 138 forward when the jog forward button 239 is activated.

In step 297, the tester 70 is clamped to the railcar 24. The hydraulic clamps 92-95 are positioned to clamp onto the sill 22 of the railcar 24 by adjusting the arm and lift carriages 100-102 and the sleeves 126-129. A separate set of controls (not shown) such as one or more joy-stick type controls are provided for making these adjustments. When the hydraulic clamps 92-95 are properly positioned, the operator activates the hydraulic clamps 92-95 by pulling out the clamp engaged button 235 which is an illuminated push/pull type button. Pulling the clamp engaged button 235 causes the motion controller 204 to drive electrically controlled valves (not shown) connected to the hydraulic and electrical systems 134, 206 which actuate the hydraulic clamps 92-95.

In step 298, the tester and railcar couplers 51, 154 are coupled together. Using the jog forward button 239, the operator nudges the piston 138 forwardly until the couplers 51, 154 engage. Then, in steps 300-301, the operator again waits for the hydraulic system 134 to come up to full pressure.

Steps 302-303 (see FIG. 7) prepare the data acquisition computer 264. If, at decision step 302, the data acquisition computer 264 has already been set-up, then set-up step 303 is omitted. In the set-up step 303, the data acquisition computer 264 is prepared by turning the computer 264 on, starting a data acquisition program, and entering test data such as identification information for the railcar 24 and the cushion device 20.

After the preparatory steps 286-303 have been completed, the tester 70 is ready to begin cushion device testing. The test ready indicator light 234 should be illuminated at this time. The tester 70 in the illustrated embodiment performs a series of four tests, a pin-stop test, a buff test, a return test, and a draft test. To initiate the tests in step 304, the operator switches the tester 70 to test mode using the manual/test selector switch 237 and activates the start test button 238.

Figure 8:
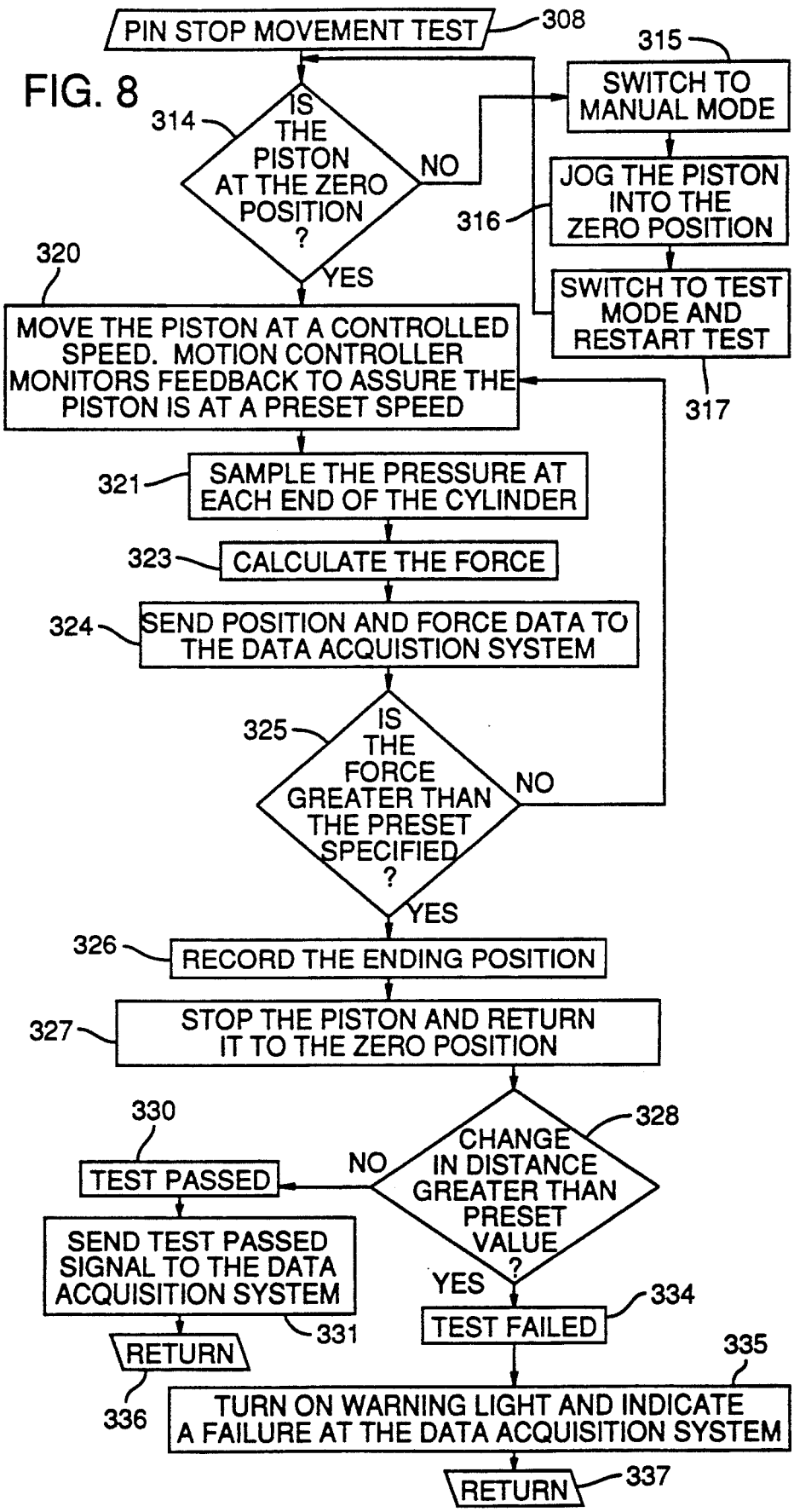
FIG. 8 is a flow chart of a pin stop movement test procedure performed with the portable railcar cushion device tester of FIG. 2.

With reference to FIG. 8, after the start test button 238 is activated, the tester 70 first performs a pin-stop test 308 at step 310 (FIG. 7). The purpose of the pin-stop test 308 is to determine the amount of "slop" in the pin 52 connecting the railcar coupler 51 to the cushion device 20. The pin-stop test should begin with the piston 138 initially at a "zero" position. The zero position is the position at which the piston 138 is retracted farthest in the cylinder 144 away from the railcar 24 with the couplers 51, 154 engaged. In this position, the piston is prevented from retracting farther into the cylinder away from the railcar 24 by the cushion device stop 64 engaging the sill lug stop 54 (FIG. 1). If the piston 138 is not in the zero position at the beginning of the pin-stop test 308 (step 314), the piston is moved to the zero position in steps 315-317. To move the piston to the zero position, the tester 70 is switched to manual mode using the manual/test selector switch 237 (step 315). Then, in step 316, the piston is retracted to the zero position by activating the jog reverse button 240 until the stops 64, 54 engage. Finally, in step 317, the test is restarted by switching back to the test mode using the manual/test selector switch 237 and by activating the test start button 238.

Next, in step 320 (FIG. 8), the motion controller 204 moves the piston 138 forwardly from the zero position at a predetermined controlled velocity. As described above, the position transducer 210 provides feedback to monitor the position of the piston 138 and ensure that the predetermined velocity is maintained. As the piston 138 is moved forwardly, the motion controller 204 also monitors the force applied to the cushion device 20 in steps 321-325. In step 321, the motion controller 204 samples the pressure on the blind and rod ends 200, 201 of the piston 138 from the signals generated by the pressure transducers 212, 214. In step 322, the motion controller 204 determines the force applied to the cushion device according to equation (1) above. The position and force information generated by the motion controller 204 in steps 320 and 323 is then transmitted to the data acquisition computer 264 (step 324). In decision step 325, the motion controller 204 compares the force calculated in step 323 to a predetermined threshold magnitude. While there is still slop in the coupler pin 52, the force will be less than the threshold magnitude. However, when the slop is taken up and the forward motion of the piston begins to compress the cushion device, the force will increase to a magnitude greater than the threshold magnitude. Steps 321-325 are repeated until the force applied to the cushion device 20 is greater than the threshold magnitude, indicating that the slop in the coupler pin 52 has been taken up.

In step 326, the current position of the piston 138 (where the motion of the piston begins to compress the cushion device 20) is recorded by the motion controller 204. The forward motion of the piston 138 is then stopped and the piston returned to the zero position (step 327). In step 328, the motion controller 204 compares the distance travelled by the piston between the zero and ending positions (i.e., the amount of coupler pin slop) to a predetermined standard distance. If the distance travelled is less than the standard distance, then the coupler pin 52 has an acceptable amount of slop and has passed the pin-stop test (step 330). In step 331, the motion controller 204 transmits a signal to the data acquisition computer 264 indicating that the test was a success. If, however, the distance travelled is greater than the standard distance, then the amount of slop is unacceptable and the test is failed (step 334). When the pin-stop test 308 is failed, the motion controller 204 illuminates the test failure indicator light 236 on the operator console 242 and transmits a signal to the data acquisition computer 264 to indicate the test was failed (step 335). Failure of the pin-stop test 308 also ends the test procedure 280 (step 337 and step 338 of FIG. 7).

Figure 9:
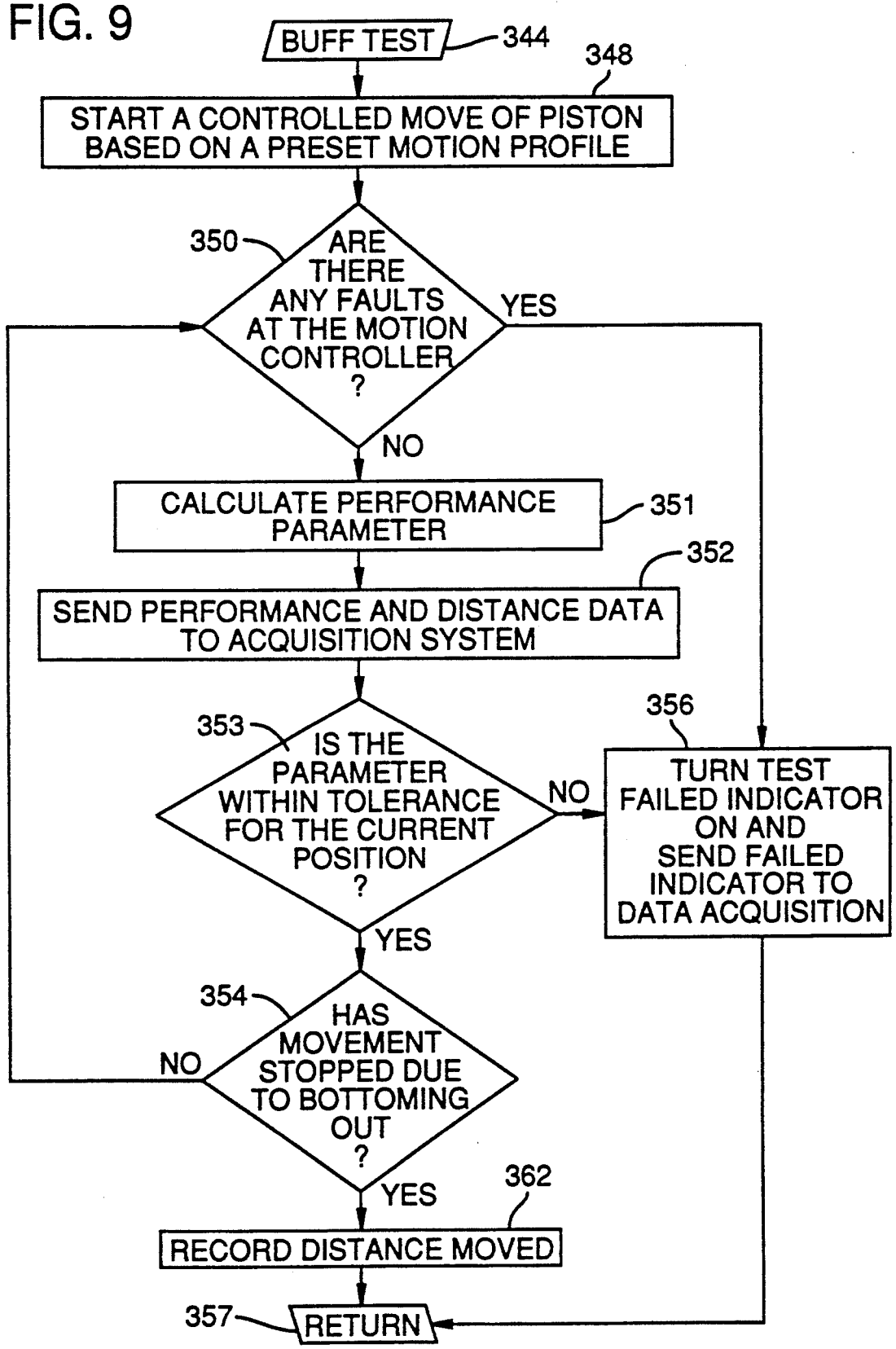
FIG. 9 is a flow chart of a buff test procedure performed with the portable railcar cushion device tester of FIG. 2.

With reference to FIG. 9, after a successful completion of the pin-stop test 308, the test procedure 280 continues to the buff test 344 (step 336 of FIG. 8 and steps 338, 340 of FIG. 7). In step 348 the buff test 344, the cushion device 20 is compressed in a controlled motion by the motion controller 204 according to a predetermined motion profile 354-357 as described above. While the cushion device 20 is being compressed, steps 350-354 are continuously repeated. At step 351, the motion controller 204 determines a parameter related to the performance of the cushion device 20 such as the force applied to the cushion device 20 or the damping coefficient of the cushion device 20 (the performance parameter) from the pressure and position transducer signals as described above. At step 352, the performance parameter determined from the transducer signals and the position of the piston 138 determined from the position transducer signal are transmitted to the data acquisition computer 264. The buff test 344 is failed at step 353 if the performance parameter determined in step 351 is not within a predetermined tolerance of an empirically determined standard described above for cushion devices in good condition at the current position in the motion profile. The buff test 344 is also failed at step 350 if the motion controller 204 generates a fault. The motion controller 204 generates a fault if diagnostic sensors indicate a problem in the tester 70. For example, float level switches (not shown) in the hydraulic system 134 (FIG. 4) signal the motion controller when a loss in hydraulic oil occurs due to a break or leak in the hydraulic system. Other sensors can be used to detect excessively high temperatures or a drop in pressure below an acceptable minimum level. When the buff test 344 is failed, the motion controller 204 illuminates the test failure indicator light 236, signals the data acquisition computer 264 that the test was failed, and ends the test procedure 280 by returning to the initial step 286 (steps 356–357 and step 358 of FIG. 7).

The steps 350–354 of the buff test 344 continue repeating until either the test is failed or the movement of the cushion device 20 is halted such as by the back stop 62 (FIG. 1) engaging the back stop casting 39. When cushion device movement is halted, the motion controller 204 records the distance moved in the buff test 344 and transmits the distance information to the data acquisition computer 264 (step 362). The test procedure 280 then continues to the cushion return test 366 (steps 358–368 of FIG. 7).

Figure 10:
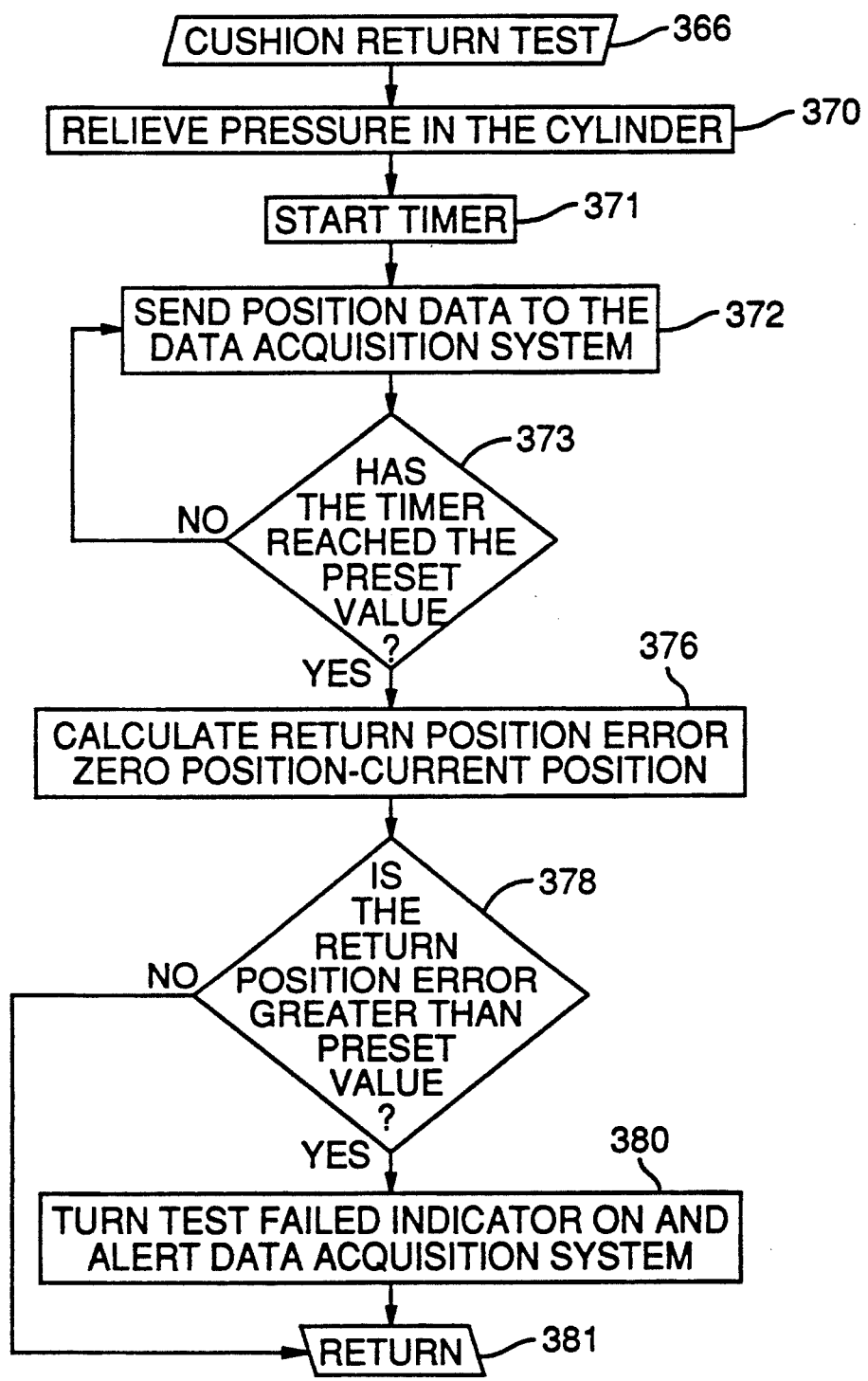
FIG. 10 is a flow chart of a cushion return test performed with the portable railcar cushion device tester of FIG. 2.

Referring to FIG. 10, the cushion return test 366 is performed at step 368 (FIG. 7) to determine whether the mechanical springs or gas charged device used to return the cushion device 20 to the draft position is functioning properly. The cushion return test 366 is performed by, first, relieving the pressure in the cylinder 144 (step 370). The motion controller 204 relieves the pressure in the cylinder 144 by activating the unloading valves 198, 199. With the pressure relieved, the mechanical springs or gas charged device can freely operate to return the cushion device 20 to the draft position. At step 371, after relieving the pressure, the motion controller 204 starts an internal timer. Then, in step 372, the motion controller 204 determines the position of the piston 138 from the position transducer signal and transmits the position information to the data acquisition computer 264. Step 372 is repeated until the timer reaches a predetermined time (step 373).

When the predetermined time has elapsed, the motion controller 204 calculates a return position error equal to the difference between the zero position and the current position of the piston 138 (step 376). In step 378, the motion controller 204 compares the return position error to a predetermined standard return position error for a cushion device in good condition. If the return position error is greater than the standard, then the return test 366 is failed. When the return test 366 in failed, the motion controller 204 illuminates the test failure indicator light 236, signals the data acquisition computer 264 that the return test 366 was failed, and ends the test procedure 280 by returning to the initial step 286 of FIG. 6 (steps 380–381 and step 384 of FIG. 7). If, however, the return position error is not greater than the standard, the return test 366 passes and the test procedure 280 continues to the draft test 388 (steps 384, 390 of FIG. 7).

Figure 11:
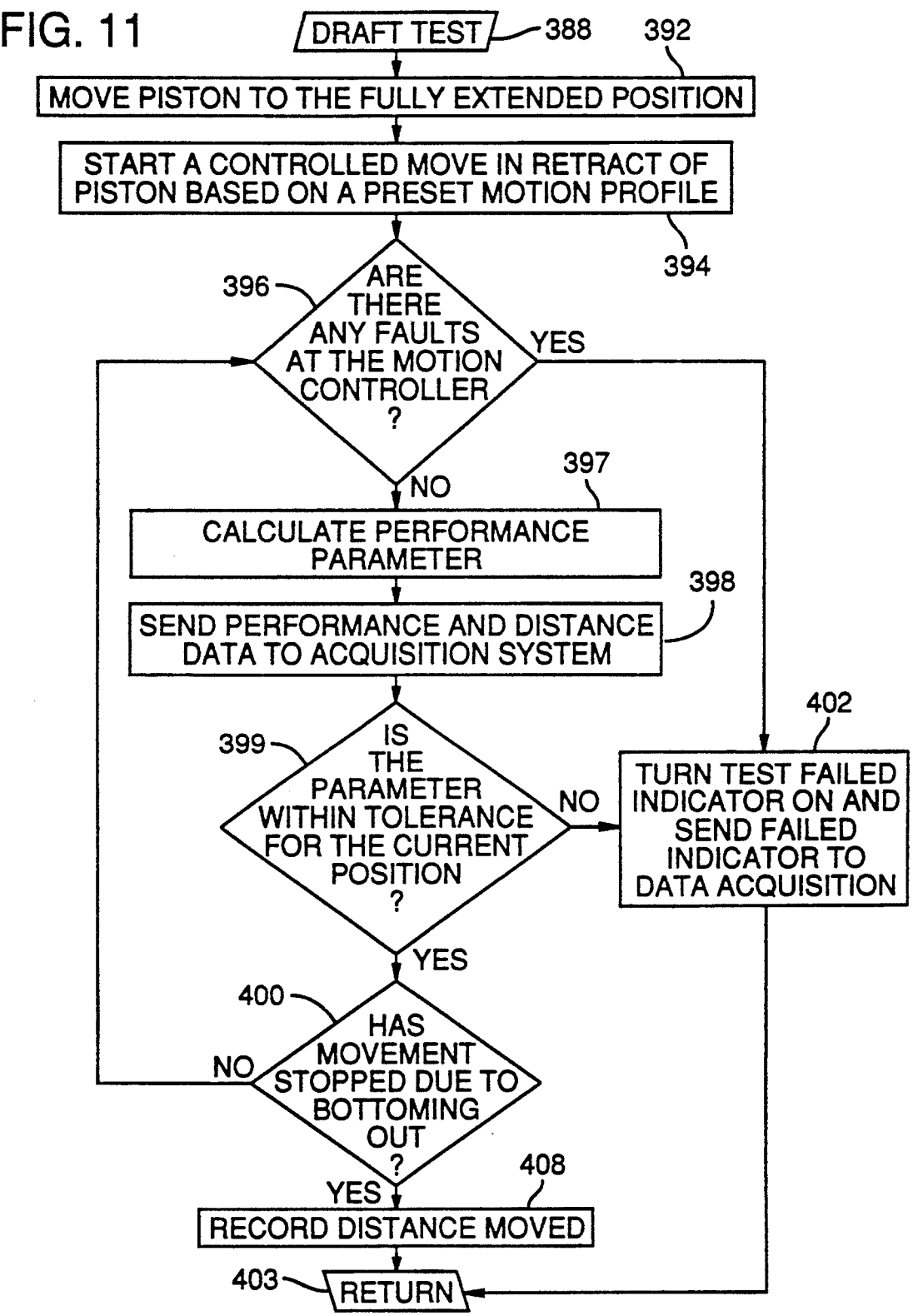
FIG. 11 is a flow chart of a draft test performed with the portable railcar cushion device tester of FIG. 2.

Referring to FIG. 11, in the draft test 388, the performance of the cushion device 20 is analyzed while being forcibly extended or decompressed from the buff position to the draft position according to a predetermined motion profile. First, in step 392, the cushion device 20 is compressed to the buff position where the back stop 62 engages the back stop casting 39. From the buff position, the motion controller 204 begins retracting the piston 138 to expand the cushion device 20 in a controlled motion according to a predetermined motion profile (step 394). While the piston 138 is being retracted, the motion controller 204 continuously repeats steps 396–400.

In steps 397–398, the motion controller 204 determines a performance parameter of the cushion device 20 such as the force applied to the cushion device 20 or its damping coefficient then transmits the performance parameter and distance information to the data acquisition computer 264. At step 399, the motion controller 204 determines whether the performance parameter is within a predetermined tolerance of an empirically determined standard for cushion devices in good condition at the current position in the motion profile. If the performance parameter is not within the tolerance, then the test is failed. The test is also failed if the motion controller 204 generates a fault at step 396. Steps 396–400 are repeated until the test is failed or the retracting motion of the piston is stopped by the cushion device stop 64 engaging the stop 54 in the cushion device's draft position (step 400).

If the draft test 388 is failed at steps 396, 399, the motion controller 204 turns on the test failure indicator light 236 and signals to the data acquisition computer 264 that the test was failed (steps 402–403 and steps 404–405 of FIG. 7). If the draft test 388 is successful, the motion controller 204 determines the distance travelled by the piston 138 in the test and transmits the distance travelled to the data acquisition computer 264 for recording (step 408). After the draft test 388 is completed, the test procedure 280 returns to its initial step 286 (FIG. 6). The test data acquired by the data acquisition computer 264 can then be displayed, printed, or stored.

Referring to FIG. 14, a portable railcar cushion device tester 420 according to a second embodiment of the invention has hydraulic clamps 424–427 configured to attach to a bolster plate 430 of a railcar 432. The hydraulic clamps 424–427 each have a pair of sleeves or bushings 434–437 that are slidingly engaged on pairs of parallel support arms 440–441 that are circular in cross section and extend forwardly from the tester 420, one pair to each side of the railcar 432. The support arms 440–441 are mounted on arm and lift carriages 446–449 at a forward end 450 of the tester 420 to permit vertical and lateral horizontal adjustment. In contrast to the lift and arm carriages 100–102 (FIGS. 2, 3) of the first embodiment which travel in the grooves of spaced parallel channels 112–115, each of the carriages 446–449 travels on spaced, parallel circular cross section bars 452–455.

Each of the hydraulic clamps 424–427 have a pair of laterally extending, vertically opposed, hydraulically actuated jaws 460–463 for gripping the bolster plate 430. The jaws 461, 463 of the forward most hydraulic clamps 425, 427 are on a back side of the clamps 425, 427 while the jaws 460, 462 of the rearward most hydraulic clamps 424, 426 are on a front side. The booster plate 430 can therefore be gripped between the hydraulic clamps 424–425 and 426–427 on each pair of support arms 440–441, respectively.

The tester 420 further includes a rod carriage 468 which is slidably engaged on guide bars 470–471 to permit longitudinal horizontal travel. The rod carriage 468 is propelled forwardly and rearwardly along the guide bars 470–471 by an electronically controlled hydraulic ram 474. A coupler 478 mounted on a forward side of the rod carriage 468 is vertically adjustable along a vertical guide bar 480. With the rod carriage 468, the height of the coupler 478 can be adjusted to match the height of a coupler 482 on the railcar 432. An hydraulic drive system and an electronic control system such as described above is provided to drive the ram 474 and analyze the condition of the cushion device of the railcar 432.

Referring to FIG. 15, a stationary railcar cushion device tester 500 according to a third embodiment of the invention comprises a hydraulic ram 502 mounted on a supporting frame 504. The frame 504 is attached with hydraulically actuated rail clamps 508–509 to parallel rails 512 of a railroad track 514. With the rail clamps 508–509, the tester 500 can be installed on the track 514 as a permanent or semi-permanent stationary test fixture.

The tester 500 also comprises a hydraulic drive system and an electronic control system such as described above to drive the ram 502 and analyze the condition of a cushion device 518 of a railcar 520. While the cushion device 518 is being tested, the railcar 520 is clamped to the rails 512 using hydraulically actuated rail and wheel clamps 522–525 to prevent the railcar from moving.

Referring to FIGS. 16–17, a stationary railcar cushion device tester 540 according to a fourth embodiment of the invention comprises a hydraulic ram 542 mounted in a supporting frame 544 and driven by a hydraulic drive system 546 and an electronic control system 547 such as described above. A cushion device 548 which is to be tested is attached at its butt end 550 to a cylinder back stop 552 on the frame 544 with a pin 554 received in cooperative openings in the cushion device and back stop. The hydraulic ram 542 operatively engages a ram carriage 558 to which an extending end 560 of the cushion device's rod 562 is coupled. As described above, the hydraulic ram 542 applies force to the cushion device 548 to effect a predetermined, controlled motion of the cushion device so that the cushion device's performance can be analyzed by the electronic control system.

Having described and illustrated the principles of our invention with reference to a preferred embodiment, it will be recognized that the invention can be modified in arrangement and detail without departing from such principles. In view of the many possible embodiments to which the principles of our invention may be put, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A tester for analyzing the performance of a railcar cushion device, comprising:
   a frame for supporting said tester;
   means for securing said frame to a cushion device;
   a hydraulic ram mounted on said frame;
   coupling means on said hydraulic ram for operatively engaging the cushion device;
   means for supplying hydraulic fluid to said ram;
   a valve for regulating, responsive to an electrical control signal, the introduction of hydraulic fluid into and discharge of said fluid from said hydraulic ram to thereby apply force to said cushion device;
   a transducer for generating a feedback signal related to the motion of said cushion device; and
   an electronic motion controller for monitoring said feedback signal and for generating said control signal such that said hydraulic ram applies sufficient force to said cushion device to move said cushion device in a predetermined motion.

2. The tester of claim 1 comprising:
   a set of wheels rotatably mounted to said frame, said wheels being operable on a track;
   whereby said tester is portable.

3. The tester of claim 2 comprising:
   a pair of fork lift tubes mounted laterally to said frame, said fork lift tubes being engageable by a pair of lifting arms of a fork lift whereby said tester can be lifted onto said track by said fork lift.

4. The tester of claim 2 wherein the means for securing said frame to said cushion device comprises:
   forwardly extending, parallel support arms mounted at their proximal ends to said frame; and
   hydraulic clamps on said support arms near distal ends thereof, each of said hydraulic clamps comprising a pair of opposed, hydraulically actuated jaws for gripping a part of a railcar in which said cushion device is mounted;
   whereby said cushion device is indirectly and securely attached to said tester.

5. The tester of claim 4 comprising:
   carriages mounted on a front end of said frame, said proximal ends of said support arms being received in said carriages and being vertically and laterally horizontally slidable in said carriages;
   whereby said support arms are vertically and laterally adjustable.

6. The tester of claim 4 wherein said hydraulic clamps each comprise:
   at least one sleeve member, said sleeve members slidably engaging said support arms whereby the positions of said hydraulic clamps on said support arms are adjustable.

7. The tester of claim 4 wherein said pair of jaws of a forward most of said hydraulic clamps on each of said support arms face rearwardly and said pair of jaws of a rearward most of said hydraulic clamps on said support arms face forwardly whereby said forward most hydraulic clamps are operative to grip a first edge of a bolster plate of said railcar and said rearward most hydraulic clamps are operative to grip a second edge of said bolster plate, said second edge being opposite said first edge.

8. The tester of claim 4 wherein said pair of jaws of each of said hydraulic clamps face inwardly whereby said hydraulic clamps are operative to grip an outwardly extending flange on a sill of said railcar.

9. The tester of claim 1 wherein said hydraulic ram comprises a cylinder and a piston on one end of a rod, said piston being slidingly engaged within said cylinder with said rod projecting outwardly from said cylinder, said coupling means being operative to attach a distal end of said rod to said cushion device.

10. The tester of claim 9 wherein said coupling means comprises a coupler for engaging a corresponding coupler attached to said cushion device on said railcar.

11. The tester of claim 9 comprising:
   a first pressure transducer for generating an electrical signal related to the pressure within said cylinder on a blind end of said piston; and
   a second pressure transducer for generating an electrical signal related to the pressure within said cylinder on a rod end of said piston;
   said motion controller being operative to process said electrical signals to determine a parameter related to the performance of said cushion device at a position of said cushion device in said predetermined motion.

12. The tester of claim 11 wherein said parameter is the force applied to said cushion device at said position to attain said predetermined motion.

13. The tester of claim 11 wherein said parameter is a damping coefficient of said cushion device at said position.

14. The tester of claim 11 wherein said motion controller is operative to determine whether said parameter is within a predetermined tolerance of a standard value of said parameter for a cushion device in good condition at said position.

15. The tester of claim 14 comprising means for recording said parameter at a number of positions of said cushion device in said predetermined motion.

16. The tester of claim 14 comprising a data acquisition computer for recording said parameter at a number of positions of said cushion device in said predetermined motion.

17. The tester of claim 1 wherein said means for supplying hydraulic fluid to said ram comprises at least one accumulator attached to said valve for storing hydraulic fluid under pressure, said valve introducing said fluid from said at least one accumulator to said hydraulic ram whereby said hydraulic ram applies sufficient force to said cushion device to attain said predetermined motion.

18. The tester of claim 1 wherein the means for securing said frame to said cushion device comprises:
a first set of clamps for attaching said frame to a railroad track;
a second set of clamps for clamping a railcar in which said cushion device is mounted to said track;
whereby said cushion device is indirectly and securely attached to said tester.

19. A method of testing railcar cushion devices comprising:
applying a force to a cushion device;
monitoring the motion of said cushion device;
continuously adjusting the magnitude of said force responsive to the motion of said cushion device to attain a predetermined motion profile;
determining a parameter related to the performance of said cushion device at a plurality of positions along said motion profile; and
comparing said parameter to a standard for cushion devices in good condition at each of said positions.

20. The method of claim 19 comprising:
indicating failure of said cushion device if said parameter is not within a tolerance of said standard for cushion devices in good condition at one of said positions.

21. The method of claim 19 wherein said parameter is said force applied to said cushion device to attain said motion profile.

22. The method of claim 19 wherein said parameter is a damping coefficient of said cushion device.

23. The method of claim 19 wherein said cushion device is linearly compressible and extensible and wherein said force applied to said cushion device compresses said cushion device.

24. The method of claim 19 wherein said cushion device is linearly compressible and extensible and wherein said force applied to said cushion device expands said cushion device.

25. The method of claim 19 comprising:
recording data related to said motion of said cushion device and to said parameter.

26. The method of claim 19 comprising:
displaying data related to said motion of said cushion device and to said parameter.

27. The method of claim 19 wherein said force is applied to a said cushion device through a coupler attached to said cushion device, the method comprising:
determining a distance between a zero position in which said cushion device and said coupler are fully extended and a position where a force applied to said cushion device through said coupler to attain a predetermined velocity exceeds a predetermined magnitude;
comparing said distance to a standard distance; and
indicating failure of said cushion device and said coupler if said distance exceeds said standard distance.

28. The method of claim 19 comprising:
fully compressing said cushion device;
allowing said cushion device to expand;
determining an ending position of said cushion device after a predetermined period of time has elapsed;
determining a distance between said ending position of said cushion device and a zero position in which said cushion device is fully expanded;
comparing said distance to a standard distance; and
indicating failure of said cushion device if said distance exceeds said standard distance.

29. An apparatus for testing railcar cushion devices, the apparatus comprising:
a hydraulic ram for applying a force to a cushion device being tested;
monitoring means for generating a signal related to the motion of said cushion device;
a motion controller for continuously adjusting the magnitude of said force responsive to said motion related signal to effect a predetermined motion of said cushion device by application of said force;
measurement means for determining a parameter related to the performance of said cushion device at intervals in said motion; and
comparison means for comparing said parameter to a predetermined standard for cushion devices in good condition to determine whether said parameter is within a tolerance of said standard.

30. The apparatus of claim 29 comprising:
an indicator for indicating failure of said cushion device if said parameter is not within said tolerance of said standard.

31. The apparatus of claim 29 comprising:
data acquisition means for recording and displaying motion and performance data of said cushion device.

* * * * *